US008804796B2

(12) United States Patent
Zhou

(10) Patent No.: US 8,804,796 B2
(45) Date of Patent: Aug. 12, 2014

(54) WIRELESS APPARATUS AND WIRELESS COMMUNICATION SYSTEM

(71) Applicant: Fujitsu Limited, Kawasaki (JP)

(72) Inventor: Liang Zhou, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/733,892

(22) Filed: Jan. 4, 2013

(65) Prior Publication Data
US 2013/0223487 A1     Aug. 29, 2013

(30) Foreign Application Priority Data

Feb. 28, 2012  (JP) ................................. 2012-041429

(51) Int. Cl.
H04B 1/38    (2006.01)
H04B 7/06    (2006.01)
H04B 7/04    (2006.01)
H04L 25/02   (2006.01)

(52) U.S. Cl.
CPC ............. H04L 25/02 (2013.01); H04B 7/0695 (2013.01); H04B 7/0408 (2013.01)
USPC ............. 375/219; 375/347; 455/69; 455/509

(58) Field of Classification Search
CPC ................................ H04L 1/06; H04L 1/0618
See application file for complete search history.

(56) References Cited

U.S. PATENT DOCUMENTS 7,043,275 B2 *  5/2006  Matsuoka et al. .......... 455/562.1
7,995,689 B2 *  8/2011  Park et al. ................... 375/347
8,140,024 B2 *  3/2012  Prasad et al. .................. 455/69

FOREIGN PATENT DOCUMENTS

JP    2007-529955      10/2007
WO   WO-2005/091525 A1    9/2005

* cited by examiner

Primary Examiner — Leon-Viet Nguyen
(74) Attorney, Agent, or Firm — Fujitsu Patent Center

(57) ABSTRACT

In a wireless apparatus, a first receiver receives, from a wireless reception apparatus, a transmit beam pattern with better reception quality among transmit beam patterns of a transmitter switched to by a first switching unit. A generation unit generates a transmit beam pattern obtained by rotating a phase of the received transmit beam pattern. A second switching unit switches a transmit beam pattern of the transmitter to the received transmit beam pattern and the generated transmit beam pattern. A second receiver receives, from the wireless reception apparatus, the transmit beam pattern of a combination with better reception quality out of combinations of the switched transmit beam patterns and receive beam patterns switched to by the wireless reception apparatus. A setting unit sets a transmit beam pattern of the transmitter in the transmit beam pattern received by the second receiver.

13 Claims, 17 Drawing Sheets

FIG. 2
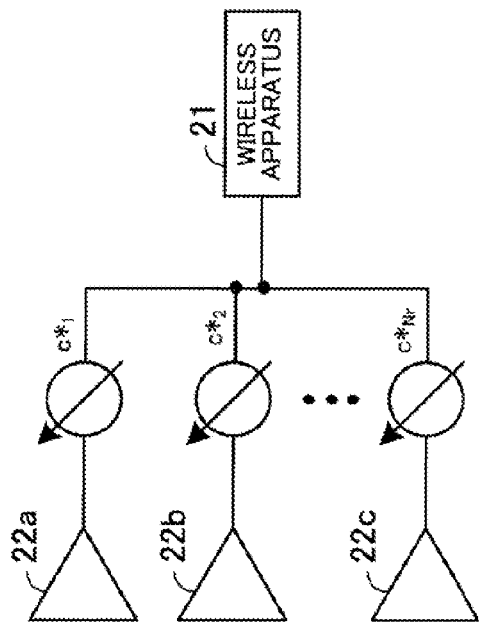
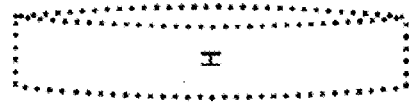
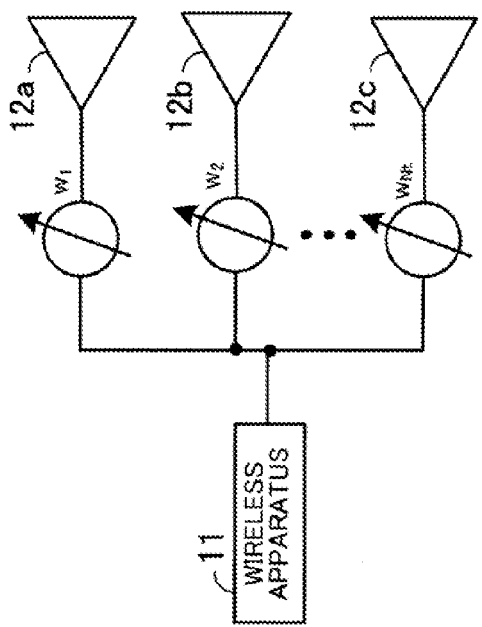

TRANSMIT BEAM PATTERN
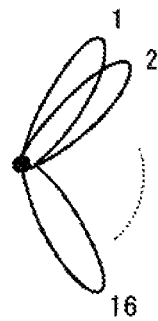
RECEIVE BEAM PATTERN
FIG. 5A
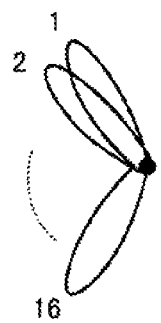
FIG. 5B
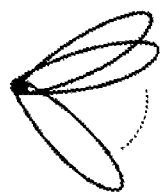
FIG. 5C

FIG. 9

$$\begin{pmatrix} & k=0 & k=1 & & k=K-1 \\ m=0 & w_{00} & w_{01} & \cdots & w_{0K-1} \\ m=1 & w_{10} & w_{11} & \cdots & w_{1K-1} \\ & \vdots & \vdots & & \vdots \\ m=M-1 & w_{M-10} & w_{M-11} & \cdots & w_{M-1K-1} \end{pmatrix}$$

WIRELESS APPARATUS AND WIRELESS COMMUNICATION SYSTEM

CROSS-REFERENCE TO RELATED APPLICATION

This application is based upon and claims the benefit of priority of the prior Japanese Patent Application No. 2012-041429, filed on Feb. 28, 2012, the entire contents of which are incorporated herein by reference.

FIELD

The embodiments discussed herein are related to a wireless apparatus and wireless communication system which transmit and receive a signal by using a plurality of antennas.

BACKGROUND

In a wireless communication in a millimeter wave band, a MIMO (Multiple Input Multiple Output) beam forming technique is used. For example, protocol specifications of the millimeter wave band using a MIMO beam forming technique are specified in IEEE (The Institute of Electrical and Electronics Engineers, Inc) 802.11ad.

Conventionally, there is disclosed an adaptive beam forming system using a hierarchical weight bank for an antenna array in a wireless communication system (see, for example, Japanese National Publication of International Patent Application No. 2007-529955).

In wireless communication using a MIMO beam forming technique, for performing high-quality wireless communication, it is important to fast select an accurate beam pattern.

SUMMARY

According to one aspect of the present invention, a wireless apparatus includes a transmitter configured to transmit the signal; a first switching unit configured to switch a transmit beam pattern of the transmitter; a first receiver configured to receive, from a wireless reception apparatus which receives the signal, a transmit beam pattern with better reception quality among transmit beam patterns switched to by the first switching unit; a generation unit configured to generate a transmit beam pattern obtained by rotating a phase of the transmit beam pattern received by the first receiver; a second switching unit configured to switch a transmit beam pattern of the transmitter to a transmit beam pattern received by the first receiver and a transmit beam pattern generated by the generation unit; a second receiver configured to receive, from the wireless reception apparatus, a transmit beam pattern of a combination with better reception quality out of combinations of the transmit beam patterns switched to by the second switching unit and receive beam patterns switched to by the wireless reception apparatus; and a setting unit configured to set a transmit beam pattern of the transmitter in the transmit beam pattern received by the second receiver.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates a wireless communication system according to a second embodiment;

FIGS. 5A, 5B, and 5C illustrate one example of operations specified by IEEE802.11ad;

FIG. 9 illustrates a code book;

DESCRIPTION OF EMBODIMENTS

Figure 1:
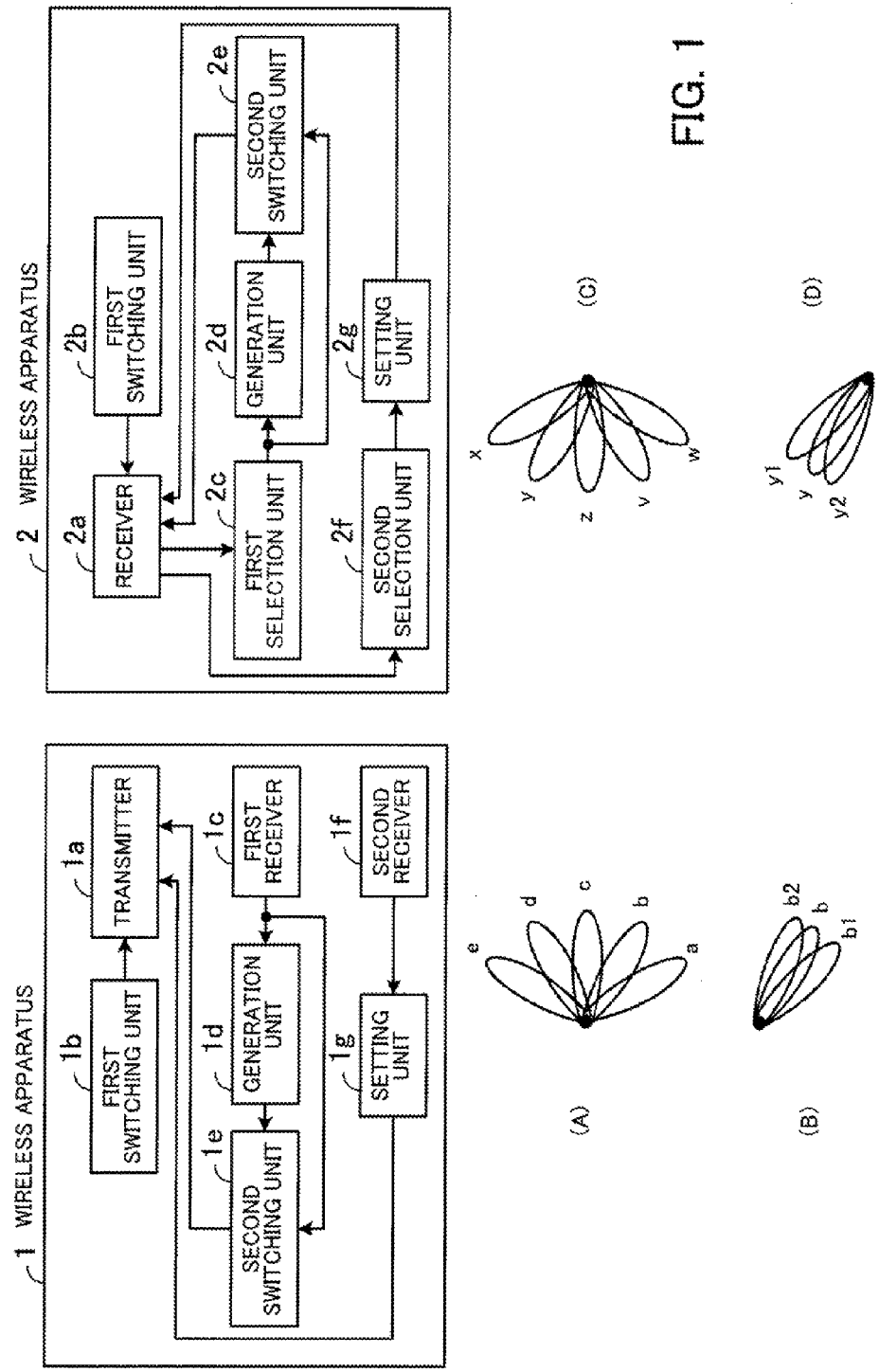
FIG. 1 illustrates a wireless communication system according to a first embodiment.

Preferred embodiments of the present invention will now be described in detail below with reference to the accompanying drawings, wherein like reference numerals refer to like elements throughout.

First Embodiment

FIG. 1 illustrates a wireless communication system according to a first embodiment. As illustrated in FIG. 1, the wireless communication system includes wireless apparatus 1 and 2. The wireless apparatus 1 has a transmitter 1a, a first switching unit 1b, a first receiver 1c, a generation unit 1d, a second switching unit 1e, a second receiver 1f, and a setting unit 1g. The wireless apparatus 2 has a receiver 2a, a first switching unit 2b, a first selection unit 2c, a generation unit 2d, a second switching unit 2e, a second selection unit 2f, and a setting unit 2g. The wireless apparatus 1 and 2 each have a plurality of antennas (not illustrated), and perform wireless communication through MIMO.

(A) and (B) illustrated on the downside of the wireless apparatus 1 of FIG. 1 illustrate transmit beam patterns of the transmitter 1a. (C) and (D) illustrated on the downside of the wireless apparatus 2 of FIG. 1 illustrate receive beam patterns of the receiver 2a.

The transmitter 1a of the wireless apparatus 1 wirelessly transmits a signal to the wireless apparatus 2.

The first switching unit 1b switches a transmit beam pattern of the transmitter 1a which wirelessly transmits a signal. For example, the first switching unit 1b changes the transmit beam pattern of the transmitter 1a to a transmit beam pattern as illustrated in (A) of FIG. 1. Next, the first switching unit 1b switches the transmit beam pattern of the transmitter 1a to a transmit beam pattern b. In a similar fashion, the first switching unit 1b switches the transmit beam pattern of the transmitter 1a sequentially to transmit beam patterns c to e. Specifically, the first switching unit 1b switches a transmit beam pattern of the transmitter 1a to the transmit beam patterns a, b, c, d, and e.

Among the transmit beam patterns switched to by the first switching unit 1b, the first receiver 1c receives a transmit beam pattern with better reception quality from the wireless apparatus 2. For example, the wireless apparatus 2 measures reception quality of each of the switched transmit beam patterns a to e, and feeds back a transmit beam pattern with best reception quality to the wireless apparatus 1. The first receiver 1c receives the transmit beam pattern fed back from the wireless apparatus 2.

The generation unit 1d generates a transmit beam pattern obtained by rotating a phase of the transmit beam pattern received by the first receiver 1c. Suppose, for example, that the transmit beam pattern b is fed back from the wireless apparatus 2 and the first receiver 1c receives the transmit beam pattern b. In this case, as illustrated in (B) of FIG. 1, the generation unit 1d generates transmit beam patterns b1 and b2 obtained by rotating a phase of the transmit beam pattern b.

The generation unit 1d rotates a phase of the transmit beam pattern b received by the first receiver 1c, for example, between the transmit beam pattern b received by the first receiver 1c and any of the transmit beam patterns a and c adjacent to the transmit beam pattern b. Accordingly, a phase of the transmit beam pattern b1 is present between those of the transmit beam patterns b and a. Further, a phase of the transmit beam pattern b2 is present between those of the transmit beam patterns b and c.

The second switching unit 1e switches a transmit beam pattern of the transmitter 1a to the transmit beam pattern received by the first receiver 1c and the transmit beam pattern generated by the generation unit 1d. According to the foregoing example, for example, the second switching unit 1e switches the transmit beam pattern of the transmitter 1a sequentially to the transmit beam patterns b1, b, and b2, as illustrated in (B) of FIG. 1.

In combinations of the transmit beam patterns switched to by the second switching unit 1e and the receive beam patterns switched to by the wireless apparatus 2, the second receiver 1f receives, from the wireless apparatus 2, the transmit beam pattern in a combination of transmit and receive beam patterns with better reception quality.

According to the foregoing example, for example, the second switching unit 1e switches a transmit beam pattern of the transmitter 1a to the transmit beam patterns b1, b, and b2. In addition, suppose that as illustrated in (D) of FIG. 1, the wireless apparatus 2 switches a receive beam pattern to receive beam patterns y1, y, and y2. In this case, in combinations (in this case, nine combinations) of the transmit beam patterns b1, b, and b2 and the receive beam patterns y1, y, and y2, the second receiver 1f receives from the wireless apparatus 2 a transmit beam pattern in the combination of better reception quality. Suppose, more specifically, that the combination of the transmit and receive beam patterns b2 and y2 is best in the reception quality among the combinations (nine combinations) measured by the wireless apparatus 2. In this case, the wireless apparatus 2 feeds back the transmit beam pattern b2 to the wireless apparatus 1, and the second receiver 1f receives the transmit beam pattern b2.

The setting unit 1g sets a transmit beam pattern of the transmitter 1a in the transmit beam pattern received by the second receiver 1f. According to the foregoing example, for example, since the second receiver 1f receives the transmit beam pattern b2, the setting unit 1g sets a transmit beam pattern of the transmitter 1a in the transmit beam pattern b2.

For example, the transmitter 1a transmits subsequent data signals to the wireless apparatus 2 with the transmit beam pattern b2.

The receiver 2a of the wireless apparatus 2 receives a signal to be transmitted from the wireless apparatus 1.

The first switching unit 2b switches a receive beam pattern of the receiver 2a. For example, the first switching unit 2b switches a receive beam pattern of the receiver 2a to a receive beam pattern x illustrated in (C) of FIG. 1. Next, the first switching unit 2b switches a receive beam pattern of the receiver 2a to the receive beam pattern y. In a similar fashion, the first switching unit 2b switches the receive beam pattern of the receiver 2a sequentially to receive beam patterns z to w. Specifically, the first switching unit 2b switches a transmit beam pattern of the receiver 2a to the receive beam patterns x, y, z, v, and w.

Among the receive beam patterns switched to by the first switching unit 2b, the first selection unit 2c selects a receive beam pattern with better reception quality. For example, the first selection unit 2c measures reception quality of the respective switched receive beam patterns x to w, and selects a receive beam pattern with best reception quality.

The generation unit 2d generates a receive beam pattern obtained by rotating a phase of the receive beam pattern selected by the first selection unit 2c. Suppose, for example, that the receive beam pattern y is best in the reception quality. In this case, the first selection unit 2c selects the receive beam pattern y, and the generation unit 2d generates receive beam patterns y1 and y2 obtained by rotating a phase of the receive beam pattern y as illustrated in (D) of FIG. 1.

The generation unit 2d rotates a phase of the receive beam pattern y selected by the first selection unit 2c, for example, between the receive beam pattern y selected by the first selection unit 2c and any of the receive beam patterns x and z adjacent to the receive beam pattern y. Accordingly, a phase of the receive beam pattern y1 is present between those of the receive beam patterns y and x. Further, a phase of the receive beam pattern y2 is present between those of the receive beam patterns y and z.

The second switching unit 2e switches a receive beam pattern of the receiver 2a to the receive beam pattern selected by the first selection unit 2c and the receive beam pattern generated by the generation unit 2d. According to the foregoing example, for example, the second switching unit 2e switches the receive beam pattern of the receiver 2a sequentially to the receive beam patterns y1, y, and y2, as illustrated in (D) of FIG. 1.

In combinations of the receive beam patterns switched to by the second switching unit 2e and the transmit beam patterns switched to by the wireless apparatus 1, the second selection unit 2f selects the receive beam pattern of a combination of receive and transmit beam patterns with better reception quality.

According to the foregoing example, for example, the second switching unit 2e switches a receive beam pattern of the receiver 2a to the receive beam patterns y1, y, and y2. In addition, suppose that as illustrated in (B) of FIG. 1, the wireless apparatus 1 switches a transmit beam pattern to transmit beam patterns b1, b, and b2. In this case, in combinations (in this case, nine combinations) of the receive beam patterns y1, y, and y2 and the transmit beam patterns b1, b, and b2, the second selection unit 2f selects a receive beam pattern in the combination of better reception quality. Suppose, more specifically, that the combination of the transmit and receive beam patterns b2 and y2 is best in the reception quality among the combinations (nine combinations) measured by the second selection unit 2f. In this case, the second selection unit 2f selects the receive beam pattern y2.

The setting unit 2g sets a receive beam pattern of the receiver 2a to the receive beam pattern selected by the second selection unit 2f. According to the foregoing example, for example, since the second selection unit 2f selects the receive beam pattern y2, the setting unit 2g sets a receive beam pattern of the receiver 2a in the receive beam pattern y2. For example, the receiver 2a receives subsequent data signals with the receive beam pattern y2.

Operations of the wireless communication system of FIG. 1 will be described. The wireless apparatus 2 first fixes the receiver 2a to an arbitrary receive beam pattern. For example, the wireless apparatus 2 fixes the receiver 2a to the receive beam pattern z. In a state where a receive beam pattern is fixed, the first switching unit 1b of the wireless apparatus 1 switches a transmit beam pattern of the transmitter 1a sequentially to the transmit beam patterns a to e, as illustrated in (A) of FIG. 1.

The wireless apparatus 2 measures reception quality of the respective switched transmit beam patterns a to e. The wireless apparatus 2 feeds back a transmit beam pattern with better reception quality to the wireless apparatus 1. Suppose, for example, that since the transmit beam pattern b is best in the reception quality, the wireless apparatus 2 feeds back the transmit beam pattern b to the wireless apparatus 1. The first receiver 1c of the wireless apparatus 1 receives the transmit beam pattern b fed back from the wireless apparatus 2.

Next, the wireless apparatus 1 fixes the transmitter 1a to an arbitrary transmit beam pattern. For example, the wireless apparatus 1 fixes the transmitter 1a to the transmit beam pattern c. In a state where a transmit beam pattern is fixed, the first switching unit 2b of the wireless apparatus 2 switches a receive beam pattern of the receiver 2a sequentially to the receive beam patterns x to w, as illustrated in (C) of FIG. 1.

Among the switched receive beam patterns x to w, the first selection unit 2c selects a receive beam pattern with best reception quality. Suppose, for example, that the first selection unit 2c selects the receive beam pattern y.

Next, the generation unit 1d of the wireless apparatus 1 rotates a phase of the transmit beam pattern b received by the first receiver 1c, and generates the transmit beam patterns b1 and b2. The generation unit 2d of the wireless apparatus 2 rotates a phase of the receive beam pattern y selected by the first selection unit 2c, and generates the receive beam patterns y1 and y2.

As illustrated in (B) of FIG. 1, the second switching unit 1e of the wireless apparatus 1 switches a transmit beam pattern of the transmitter 1a to the transmit beam patterns b1, b, and b2. As illustrated in (D) of FIG. 1, the second switching unit 2e of the wireless apparatus 2 switches a receive beam pattern of the receiver 2a to the receive beam patterns y1, y, and y2.

The wireless apparatus 2 measures reception quality of every different combination of the transmit beam patterns b1, b, and b2 illustrated in (B) of FIG. 1 and the receive beam patterns y1, y, and y2 illustrated in (D) of FIG. 1. For example, the wireless apparatus 2 measures reception quality of each of the receive beam patterns y1, y, and y2 with relation to the transmit beam pattern b2. Next, the wireless apparatus 2 measures reception quality of each of the receive beam patterns y1, y, and y2, with relation to the transmit beam pattern b. Next, the wireless apparatus 2 measures reception quality of each of the receive beam patterns y1, y, and y2 with relation to the transmit beam pattern b1. Accordingly, nine reception quality levels are present.

Suppose that the combination of the transmit beam pattern b2 and the receive beam pattern y2 is best in the reception quality. In this case, the second receiver 1f of the wireless apparatus 1 receives the transmit beam pattern b2. The second selection unit 2f of the wireless apparatus 2 selects the receive beam pattern y2.

The setting unit 1g of the wireless apparatus 1 sets a transmit beam pattern of the transmitter 1a in the transmit beam pattern b2. The setting unit 2g of the wireless apparatus 2 sets a receive beam pattern of the receiver 2a in the receive beam pattern y2. In subsequent data communication, the transmitter 1a and the receiver 2a perform wireless communication with the transmit and receive beam patterns b2 and y2.

As can be seen from the above discussion, the wireless apparatus 1 and 2 select transmit and receive beam patterns with better reception quality, and generate the transmit and receive beam patterns obtained by rotating their phases. The wireless apparatus 1 and 2 then select a combination of transmit and receive beam patterns with better reception quality based on the selected transmit and receive beam patterns and the transmit and receive beam patterns obtained by a phase rotation. At a result, the wireless apparatus 1 and 2 fast select accurate transmit and receive beam patterns.

Second Embodiment

Next, a second embodiment will be described in detail with reference to drawings.

FIG. 2 illustrates a wireless communication system according to the second embodiment. As illustrated in FIG. 2, the wireless communication system includes wireless apparatus 11 and 21. The wireless apparatus 11 wirelessly transmits a signal to the wireless apparatus 21.

The wireless apparatus 11 has Nt pieces of antennas 12a, 12b, . . . , and 12c. The wireless apparatus 21 has Nr pieces of antennas 22a, 22b, . . . , and 22c. The wireless apparatus 11 and 21 perform wireless communication through MIMO. The wireless apparatus 11 and 21 perform millimeter wave communication of 60 GHz, for example, in conformity to IEEE802.11ad.

When changing weights $w_1, w_2, \ldots,$ and $w_{Nt}$ of the antennas 12a, 12b, . . . , and 12c and $c^*_1, c^*_2, \ldots,$ and $c^*_{Nr}$ of antennas 22a, 22b, . . . , and 22c, the wireless apparatus 11 and 21 match transmit and receive beam patterns with each other.

For example, when obtaining weights w and c satisfying the following formula (1), the wireless apparatus 11 and 12 obtain transmit and receive beam patterns with a maximum gain.

$$(\hat{w}, \hat{c}) = \max_{w \in W, c \in C} |c^H H w|^2 \tag{1}$$

W of formula (1) represents a code book of the transmission side (wireless apparatus 11), and C represents a code book of the reception side (wireless apparatus 21). H represents a channel matrix between the wireless apparatus 11 and 21, and $c^H$ represents complex-conjugate transposition of c.

Figure 3:
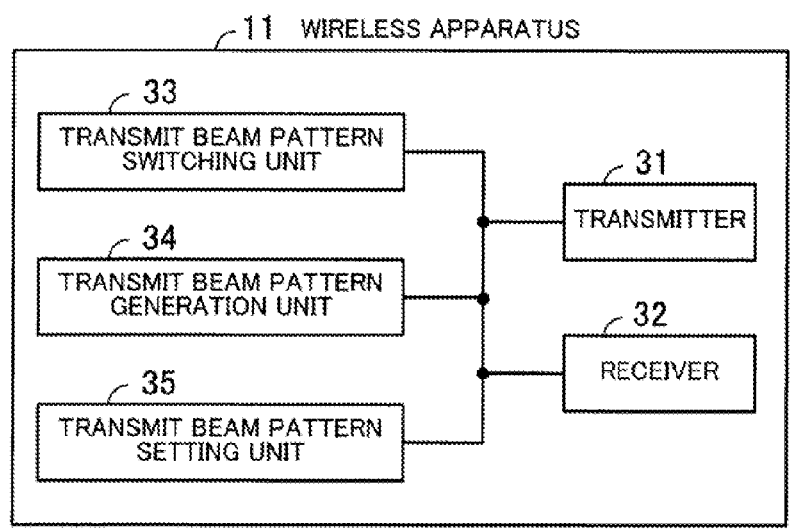
FIG. 3 is a block diagram illustrating a wireless apparatus on a transmission side.

FIG. 3 is a block diagram illustrating the wireless apparatus on the transmission side. The wireless apparatus 11 has a transmitter 31, a receiver 32, a transmit beam pattern switching unit 33, a transmit beam pattern generation unit 34, and a transmit beam pattern setting unit 35.

The transmitter 31 wirelessly transmits a signal to the wireless apparatus 21. The transmitter 31 wirelessly transmits a signal through the Nt pieces of antennas 12a, 12b, . . . , and 12c illustrated in FIG. 2.

The receiver 32 receives a signal wirelessly transmitted from the wireless apparatus 21. The receiver 32 receives a signal wirelessly transmitted through the Nt pieces of antennas 12a, 12b, ..., and 12c illustrated in FIG. 2.

The transmit beam pattern switching unit 33 controls a transmit beam pattern of the transmitter 31.

The transmit beam pattern generation unit 34 generates a transmit beam pattern.

The transmit beam pattern setting unit 35 sets a transmit beam pattern of the transmitter 31.

Here, the transmitter 31 illustrated in FIG. 3 corresponds, for example, to the transmitter 1a of FIG. 1. The receiver 32 corresponds, for example, to the first and second receivers 1c and 1f. The transmit beam pattern switching unit 33 corresponds, for example, to the first and second switching units 1b and 1e. The transmit beam pattern generation unit 34 corresponds, for example, to the generation unit 1d. The transmit beam pattern setting unit 35 corresponds, for example, to the setting unit 1g.

Figure 4:
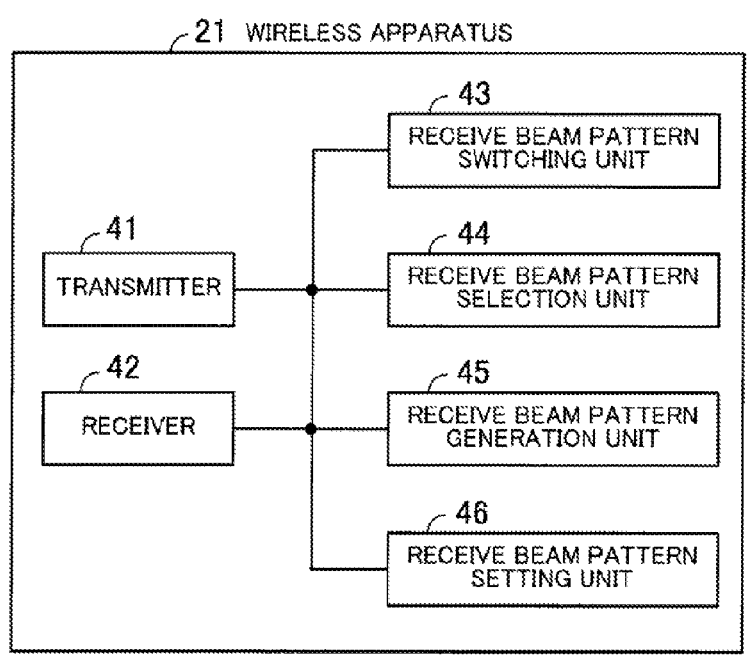
FIG. 4 is a block diagram illustrating a wireless apparatus on a reception side.

FIG. 4 is a block diagram illustrating the wireless apparatus on the reception side. The wireless apparatus 21 has a transmitter 41, a receiver 42, a receive beam pattern switching unit 43, a receive beam pattern selection unit 44, a receive beam pattern generation unit 45, and a receive beam pattern setting unit 46.

The transmitter 41 wirelessly transmits a signal to the wireless apparatus 11. The transmitter 41 wirelessly transmits a signal through the Nr pieces of antennas 22a, 22b, ..., and 22c illustrated in FIG. 2.

The receiver 42 receives a signal wirelessly transmitted from the wireless apparatus 11. The receiver 42 receives a signal wirelessly transmitted through the Nr pieces of antennas 22a, 22b, ..., and 22c illustrated in FIG. 2.

The receive beam pattern switching unit 43 controls a receive beam pattern of the receiver 42.

The receive beam pattern selection unit 44 selects a receive beam pattern with better reception quality. The receive beam pattern selection unit 44 further selects a combination of transmit and receive beam patterns with better reception quality.

The receive beam pattern generation unit 45 generates a receive beam pattern.

The receive beam pattern setting unit 46 sets a receive beam pattern of the receiver 42.

Here, the receiver 42 illustrated in FIG. 4 corresponds, for example, to the receiver 2a of FIG. 1. The receive beam pattern switching unit 43 corresponds, for example, to the first and second switching units 2b and 2e. The receive beam pattern selection unit 44 corresponds, for example, to the first and second selection units 2c and 2f. The receive beam pattern generation unit 45 corresponds, for example, to the generation unit 2d. The receive beam pattern setting unit 46 corresponds, for example, to the setting unit 2g.

Before describing operations of the wireless apparatus 11 and 21 illustrated in FIGS. 2 to 4, one example of operations specified by IEEE802.11ad will be described.

FIGS. 5A, 5B, and 5C illustrate one example of operations specified by IEEE802.11ad. On the left side of FIGS. 5A, 5B, and 5C, transmit beam patterns of a wireless transmission apparatus which transmits a signal are illustrated. On the right side of FIGS. 5A, 5B, and 5C, receive beam patterns of a wireless reception apparatus which receives a signal are illustrated. Suppose that 16 transmit beam patterns and 16 receive beam patterns are present.

In IEEE802.11ad, as illustrated in a receive beam pattern of FIG. 5A, the wireless reception apparatus is first provided with an omnidirectional antenna (directionless antenna). As illustrated in a transmit beam pattern of FIG. 5A, the wireless transmission apparatus then transmits a signal to the wireless reception apparatus while switching 16 transmit beam patterns.

The wireless reception apparatus measures an SNR (Signal to Noise Ratio) of each of the 16 transmit beam patterns switched on the transmission side. The wireless reception apparatus selects Ntx pieces of transmit beam patterns with large SNRs. Suppose that a value of Ntx is smaller than the number of transmit beam patterns and here equal to seven. The wireless reception apparatus feeds back the seven selected transmit beam patterns to the wireless transmission apparatus.

Next, as illustrated in the transmit beam pattern of FIG. 5B, the wireless transmission apparatus is provided with an omnidirectional antenna and transmits a signal to the wireless reception apparatus. As illustrated in the receive beam pattern of FIG. 5B, the wireless reception apparatus then switches the 16 receive beam patterns.

The wireless reception apparatus measures an SNR of each of the 16 switched receive beam patterns. The wireless reception apparatus selects Nrx pieces of receive beam patterns with large SNRs. Suppose that a value of Nrx is smaller than the number of the receive beam patterns and here equal to seven. The wireless reception apparatus selects seven receive beam patterns with large SNRs.

As illustrated in FIG. 5C, the wireless transmission apparatus and wireless reception apparatus switch a beam pattern so that the seven fed back transmit beam patterns and the seven selected receive beam patterns may be totally combined. The wireless reception apparatus then measures an SNR of each beam pattern in the total combination and selects a combination of the transmit and receive beam patterns with the best SNR.

For example, the wireless transmit apparatus selects one transmit beam pattern from among the seven transmit beam patterns. The wireless reception apparatus subsequently switches the seven selected receive beam patterns and measures an SNR of each receive beam pattern. Subsequently, the wireless transmission apparatus selects one transmit beam pattern different from the foregoing transmit beam pattern among the seven transmit beam patterns. The wireless reception apparatus subsequently switches the seven selected receive beam patterns and measures an SNR of each receive beam pattern. Much the same is true on the following, and the wireless reception apparatus measures an SNR of the beam pattern in the total combination and selects a combination of the transmit and receive beam patterns with the best SNR.

In the case of the foregoing example, the number of steps up to the selection of a combination of the transmit and receive beam patterns with the best SNR is equal to 16+16+7×7=81.

Figure 6:
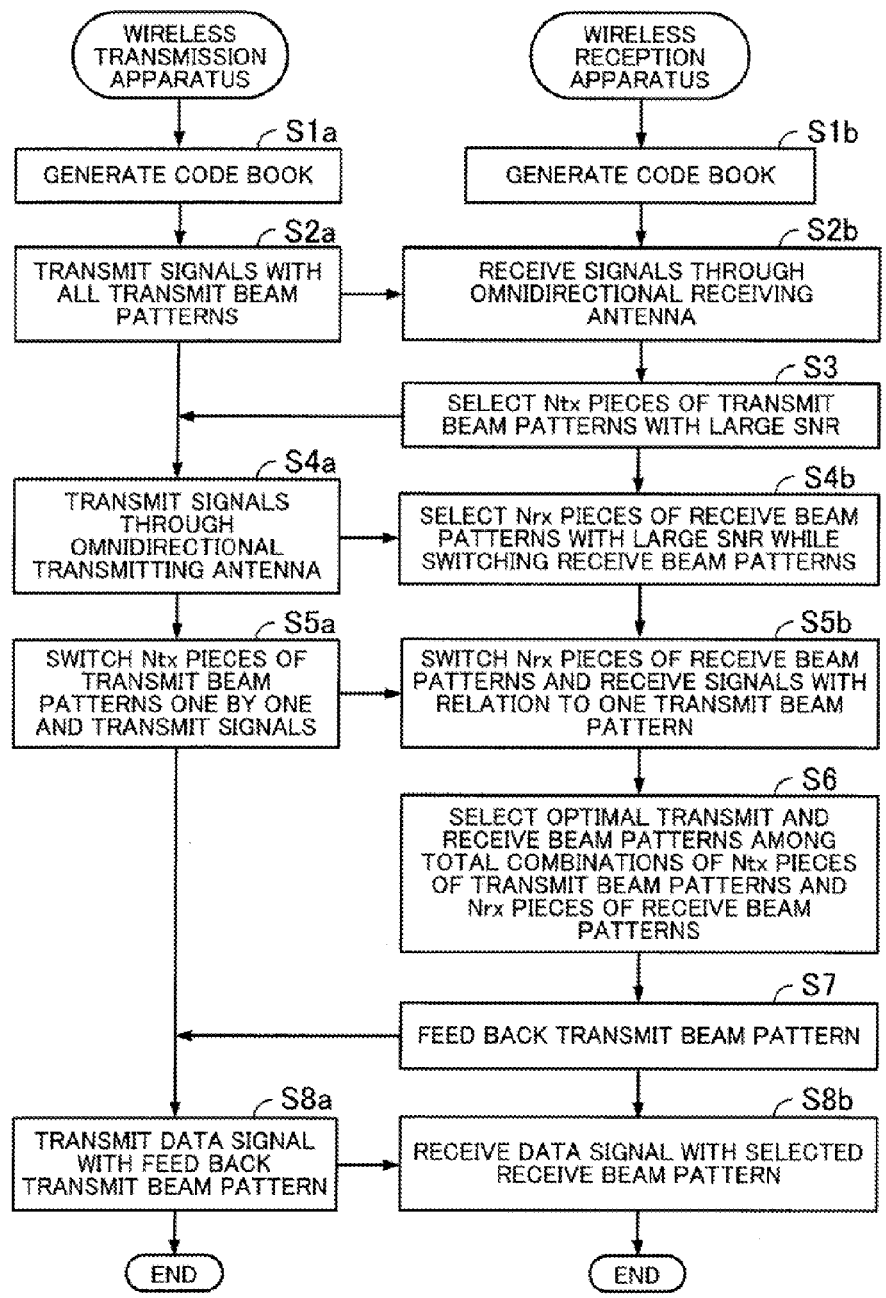
FIG. 6 is a sequence diagram illustrating an operation example specified by IEEE801.11ad.

FIG. 6 is a sequence diagram illustrating an operation example specified by IEEE801.11ad.

(Steps S1a and S1b) The wireless transmission apparatus generates a code book for generating a transmit beam pattern. The wireless reception apparatus generates a code book for generating a receive beam pattern.

(Steps S2a and S2b) The wireless transmit apparatus transmits a signal while switching a transmit beam pattern. As illustrated in FIG. 5A, for example, when transmit beam patterns are generated, the wireless transmission apparatus transmits a signal with each of the 16 transmit beam patterns.

Through an omnidirectional receiving antenna, the wireless reception apparatus receives a signal to be transmitted by the wireless transmission apparatus. The wireless reception apparatus measures an SNR of each transmit beam pattern.

(Step S3) The wireless reception apparatus selects the Ntx pieces of transmit beam patterns with large SNRs. According to examples of FIGS. 5A, 5B, and 5C, the wireless reception apparatus selects the seven transmit beam patterns with large SNRs. The wireless reception apparatus feeds back the Ntx pieces of selected transmit beam patterns to the wireless transmission apparatus.

(Steps S4a and S4b) The wireless transmission apparatus transmits a signal through an omnidirectional transmitting antenna. The wireless reception apparatus receives a signal while switching a receive beam pattern. As illustrated in FIG. 5B, for example, when 16 receive beam patterns are generated, the wireless reception apparatus transmits a signal with each of the 16 receive beam patterns.

The wireless reception apparatus measures an SNR of each receive beam pattern. The wireless reception apparatus selects the Nrx pieces of receive beam patterns with large SNRs. According to examples of FIGS. 5A, 5B, and 5C, the wireless reception apparatus selects seven receive beam patterns with large SNRs.

(Steps S5a and S5b) The wireless transmission apparatus switches the Ntx pieces of transmit beam patterns fed back at step S3 one by one, and transmits a signal.

With relation to one transmit beam pattern, the wireless reception apparatus switches the Nrx pieces of receive beam patterns selected at step S4b, and receives a signal. That is, the wireless transmission apparatus and the wireless reception apparatus transmit and receive a signal in every different combination of transmit and receive beam patterns.

The wireless reception apparatus measures an SNR of each combination of the transmit and receive beam patterns. The wireless reception apparatus measures Ntx×Nrx pieces of SNRs.

(Step S6) From among all different combinations of the Ntx pieces of transmit beam patterns and Nrx pieces of receive beam patterns, the wireless reception apparatus selects optimal transmit and receive beam patterns. That is, the wireless reception apparatus selects a combination of the transmit and receive beam patterns with largest SNR.

(Step S7) The wireless reception apparatus feeds back to the wireless transmission apparatus a transmit beam pattern of the combination selected at step S6.

(Steps S8a and S8b) The wireless transmission apparatus transmits a data signal with the transmit beam pattern fed back at step S7.

The wireless reception apparatus receives a data signal with the receive beam pattern selected at step S6.

Operations of the wireless apparatus illustrated in FIGS. 2 to 4 will be described.

Figure 7A:
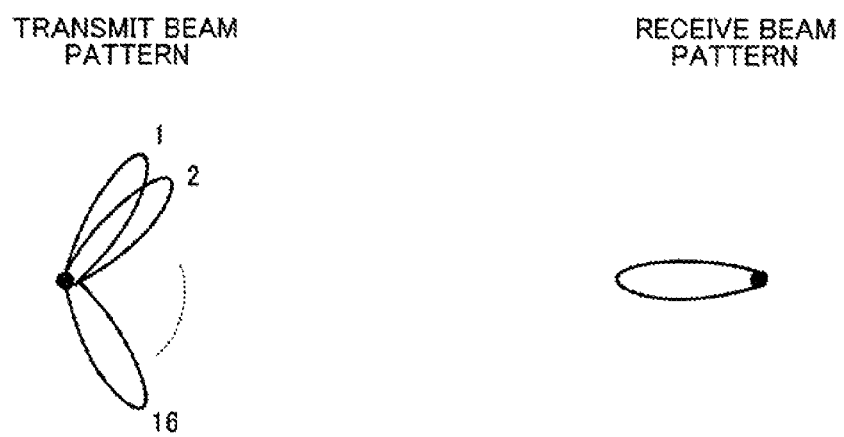
FIGS. 7A, 7B, and 7C illustrate operations of a wireless apparatus.
Figure 7B:
Figure 7C:

FIGS. 7A, 7B, and 7C illustrate operations of the wireless apparatus. On the left side of FIGS. 7A, 7B, and 7C, transmit beam patterns of the wireless apparatus 11 which transmits a signal are illustrated. On the right side of FIGS. 7A, 7B, and 7C, receive beam patterns of the wireless apparatus 21 which receives a signal are illustrated. Note that 16 transmit beam patterns and 16 receive beam patterns are supposed to be generated.

The receive beam pattern switching unit 43 of the wireless apparatus 21 selects one receive beam pattern of the receiver 42. The receive beam pattern may be arbitrarily selected. As illustrated in FIG. 7A, for example, the receive beam pattern switching unit 43 selects one receive beam pattern.

The transmit beam pattern switching unit 33 of the wireless apparatus 11 switches 16 transmit beam patterns of the transmitter 31. As illustrated in FIG. 7A, for example, the transmit beam pattern switching unit 33 switches the 16 transmit beam patterns in sequence. With each of the 16 transmit beam patterns, the transmitter 31 transmits a signal to the wireless apparatus 21.

With an arbitrary receive beam pattern selected by the receive beam pattern switching unit 43, the receiver 42 of the wireless apparatus 21 receives a signal in each of the 16 transmit beam patterns. The receive beam pattern selection unit 44 of the wireless apparatus 21 measures an SNR of each of the 16 transmit beam patterns and selects one transmit beam pattern with the best SNR. The transmit beam pattern selected by the receive beam pattern selection unit 44 is fed back to the wireless apparatus 11 by the transmitter 41.

The transmit beam pattern switching unit 33 of the wireless apparatus 11 switches a transmit beam pattern of the transmitter 31 to the fed back transmit beam pattern. As illustrated in FIG. 7B, for example, the transmit beam pattern switching unit 33 switches a transmit beam pattern of the transmitter 31 to the fed back transmit beam pattern. The transmit beam pattern illustrated in FIG. 7B is a transmit beam pattern which is fed back from the wireless apparatus 21 and which has the best SNR.

The receive beam pattern switching unit 43 of the wireless apparatus 21 switches 16 receive beam patterns of the receiver 42. As illustrated in FIG. 7B, for example, the receive beam pattern switching unit 43 switches the 16 receive beam patterns in sequence.

The receive beam pattern selection unit 44 of the wireless apparatus 21 measures an SNR of each of the receive beam patterns and selects one receive beam pattern with the best SNR.

The transmit beam pattern generation unit 34 of the wireless apparatus 11 generates a transit beam pattern obtained by rotating a phase of the fed back transmit beam pattern. For example, a transmit beam pattern x illustrated in FIG. 7C indicates a transmit beam pattern fed back from the wireless apparatus 21. Transmit beam patterns x1 and x2 each indicate a transmit beam pattern obtained by rotating a phase of the transmit beam pattern x. Suppose that x represents an index of each of the 16 transmit beam patterns and takes values of 1 to 16.

The transmit beam pattern generation unit 34 rotates a phase of the fed back transmit beam pattern between the fed back transmit beam pattern and any of the transmit beam patterns adjacent to the above transmit beam pattern. Suppose, for example, that an index x of the fed back transmit beam pattern is equal to seven. In this case, the transmit beam pattern x1 obtained by the phase rotation is generated between the transmit beam patterns 7 and 6. The transmit beam pattern x2 obtained by the phase rotation is further generated between the transmit beam patterns 7 and 8.

The receive beam pattern generation unit 45 of the wireless apparatus 21 generates a receive beam pattern obtained by rotating a phase of the selected receive beam pattern. For example, a receive beam pattern y illustrated in FIG. 7C represents a receive beam pattern selected by the receive beam pattern selection unit 44. Receive beam patterns y1 and y2 each represent a receive beam pattern obtained by rotating a phase of the receive beam pattern y. Suppose that y represents an index of each of the 16 receive beam patterns and takes values of 1 to 16.

The receive beam pattern generation unit 45 rotates a phase of the selected receive beam pattern between the selected receive beam pattern and any of the receive beam patterns adjacent to the above receive beam pattern. Suppose, for example, that an index y of the selected receive beam pattern is equal to seven. In this case, the receive beam pattern y1 obtained by the phase rotation is generated between the receive beam patterns 7 and 6. The receive beam pattern y2 obtained by the phase rotation is generated between the receive beam patterns 7 and 8.

The transmit beam pattern switching unit 33 of the wireless apparatus 11 switches a transmit beam pattern of the transmitter 31 to the fed back transmit beam pattern and the transmit beam pattern obtained by the phase rotation in sequence. As illustrated in FIG. 7C, for example, the transmit beam pattern switching unit 33 switches a transmit beam pattern to the transmit beam patterns x1, x, and x2 in sequence.

The receive beam pattern switching unit 43 of the wireless apparatus 21 switches a receive beam pattern of the receiver 42 to the selected receive beam pattern and the receive beam pattern obtained by the phase rotation in sequence. As illustrated in FIG. 7C, for example, the receive beam pattern switching unit 43 switches a receive beam pattern to the receive beam patterns y1, y, and y2 in sequence.

The transmit beam pattern switching unit 33 of the wireless apparatus 21 and the receive beam pattern switching unit 43 of the wireless apparatus 21 switch a beam pattern so that the transmit beam patterns and receive beam patterns illustrated in FIG. 7C may be totally combined with each other. The receive beam pattern selection unit 44 of the wireless apparatus 21 then measures an SNR of each beam pattern in the total combination, and selects a combination of the transmit and receive beam patterns with the best SNR.

From among the three transmit beam patterns x1, x, and x2, for example, the transmit beam pattern switching unit 33 of the wireless apparatus 11 selects one transmit beam pattern. The receive beam pattern switching unit 43 of the wireless apparatus 21 switches the three receive beam patterns y1, y, and y2 in sequence. The receive beam pattern selection unit 44 measures an SNR of each of the receive beam patterns y1, y, and y2.

Next, from among the three transmit beam patterns x1, x, and x2, the transmit beam pattern switching unit 33 of the wireless apparatus 11 selects one transmit beam pattern different from the previous transmit beam pattern. The receive beam pattern switching unit 43 of the wireless apparatus 21 switches the three receive beam patterns y1, y, and y2 in sequence. The receive beam pattern selection unit 44 measures an SNR of each of the receive beam patterns y1, y, and y2.

Much the same is true on the following descriptions. The receive beam pattern selection unit 44 of the wireless apparatus 21 measures an SNR of the beam pattern in the total combination and selects a combination of the transmit and receive beam patterns with the best SNR.

An SNR of a combination of the transmit and receive beam patterns x2 and y is supposed to be best, for example, in FIG. 7C. In this case, the receive beam pattern selection unit 44 of the wireless apparatus 21 selects a combination of the transmit and receive beam patterns x2 and y.

The receive beam pattern selection unit 44 feeds back to the wireless apparatus 11 a transmit beam pattern of the combination of the transmit and receive beam patterns with the best SNR. In the case of the foregoing example, the receive beam pattern selection unit 44 feeds back the transmit beam pattern x2 to the wireless apparatus 11.

The transmit beam pattern setting unit 35 of the wireless apparatus 11 sets a transmit beam pattern of the transmitter 31 in the fed back transmit beam pattern. In the case of the foregoing example, the transmit beam pattern setting unit 35 of the wireless apparatus 11 sets a transmit beam pattern of the transmitter 31 in the transmit beam pattern x2.

The receive beam pattern setting unit 46 of the wireless apparatus 21 sets a receive beam pattern of the receiver 42 in a receive beam pattern of the combination of the transmit and receive beam patterns with the best SNR. In the case of the foregoing example, the receive beam pattern setting unit 46 sets a receive beam pattern of the receiver 42 in the receive beam pattern y.

The transmitter 31 of the wireless apparatus 11 and the receiver 42 of the wireless apparatus 21 subsequently perform wireless communication with the set transmit and receive beam patterns.

In the case of examples of FIGS. 7A, 7B, and 7C, the number of steps up to the selection of the combination of the transmit and receive beam patterns with the best SNR is equal to 16+16+3×3=41.

As a result, the wireless apparatus 11 and 21 fast select a beam pattern by using a method illustrated in FIGS. 5A, 5B, and 5C, and FIG. 6. Further, since a combination of beam patterns with better SNR is selected with a beam pattern (beam pattern obtained by the phase rotation) finer than beam patterns (e.g., 16 beam patterns) indicated by the code book, the wireless apparatus 11 and 21 select accurate beam patterns.

Figure 8:
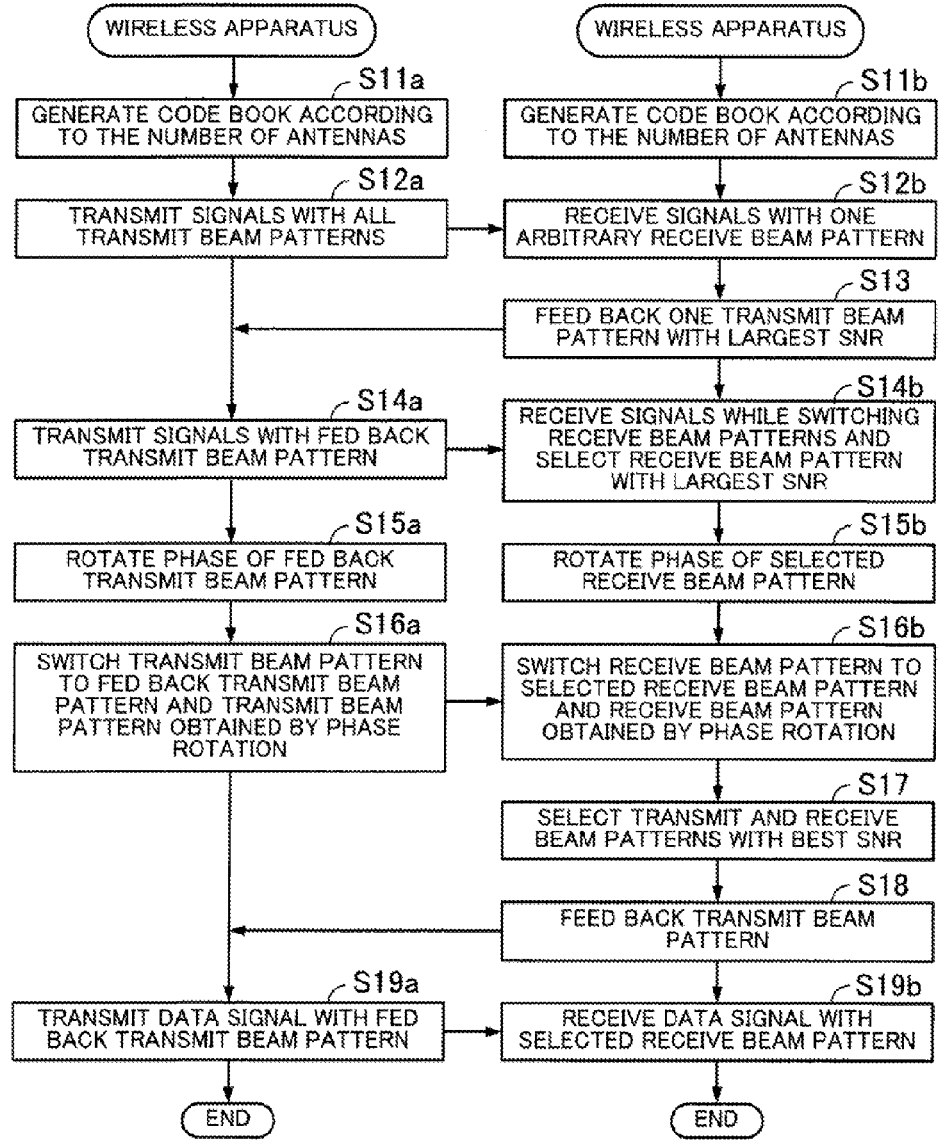
FIG. 8 is a sequence diagram illustrating operations of a wireless apparatus.

FIG. 8 is a sequence diagram illustrating operations of the wireless apparatus.

(Steps S11a and S11b) The transmit beam pattern switching unit 33 of the wireless apparatus 11 generates a code book according to the number of antennas. For example, the transmit beam pattern switching unit 33 generates a code book with the same size as that of the number of antennas. Namely, the transmit beam pattern switching unit 33 generates as many transmit beam patterns as the number of antennas.

The receive beam pattern switching unit 43 of the wireless apparatus 21 generates a code book according to the number of antennas. For example, the receive beam pattern switching unit 43 generates a code book with the same size as that of the number of antennas. Namely, the receive beam pattern switching unit 43 generates as many receive beam patterns as the number of antennas. Generation of the code book (beam patterns) will be described later.

(Steps S12a and S12b) The transmit beam pattern switching unit 33 of the wireless apparatus 11 switches a transmit beam pattern of the transmitter 31. As illustrated in FIG. 7A, for example, the transmit beam pattern switching unit 33 switches the 16 transmit beam patterns. The transmitter 31 transmits a signal to the wireless apparatus 21 with each transmit beam pattern.

The receive beam pattern switching unit 43 of the wireless apparatus 21 sets a receive beam pattern of the receiver 42 in one arbitrary receive beam pattern. The receiver 42 receives a signal to be transmitted from the wireless apparatus 11 with the set receive beam pattern.

Here, the receive beam pattern switching unit 43 may set a receive beam pattern of the receiver 42 in an omnidirectional receive beam pattern.

(Step S13) The receive beam pattern selection unit 44 measures an SNR of each transmit beam pattern. The receive beam pattern selection unit 44 selects a transmit beam pattern with the best SNR and feeds back it to the wireless apparatus 11 through the transmitter 41.

(Steps S14a and S14b) The transmit beam pattern switching unit 33 of the wireless apparatus 11 sets a transmit beam pattern of the transmitter 31 in the fed back transmit beam pattern. The receive beam pattern switching unit 43 of the wireless apparatus 21 switches a receive beam pattern of the receiver 42.

The receive beam pattern generation unit 45 measures an SNR of each of the switched receive beam patterns and selects a receive beam pattern with the best SNR.

(Steps S15a and S15b) The transmit beam pattern generation unit 34 of the wireless apparatus 11 generates a transmit beam pattern obtained by rotating a phase of the transmit beam pattern fed back at step S13. As illustrated in FIG. 7C, for example, the transmit beam pattern generation unit 34 generates the transmit beam patterns x1 and x2.

The receive beam pattern generation unit 45 of the wireless apparatus 21 generates a receive beam pattern obtained by rotating a phase of the receive beam pattern selected at step S14b. As illustrated in FIG. 7C, for example, the receive beam pattern generation unit 45 generates the receive beam patterns y1 and y2.

(Steps S16a and S16b) The transmit beam pattern switching unit 33 switches a transmit beam pattern of the transmitter 31 to the fed back transmit beam pattern and the two transmit beam patterns obtained by the phase rotation. As illustrated in FIG. 7C, for example, the transmit beam pattern switching unit 33 switches the transmit beam patterns x1, x, and x2.

The receive beam pattern switching unit 43 switches a receive beam pattern of the receiver 42 to the selected receive beam pattern and the two receive beam patterns obtained by the phase rotation. As illustrated in FIG. 7C, for example, the receive beam pattern switching unit 43 switches the receive beam patterns y1, y, and y2.

Here, the transmit beam pattern switching unit 33 and the receive beam pattern switching unit 43 switch a beam pattern so that the transmit and receive beam patterns illustrated in FIG. 7C may be totally combined with each other.

(Step S17) The receive beam pattern selection unit 44 of the wireless apparatus 21 measures an SNR of each beam pattern in the total combination and selects a combination of the transmit and receive beam patterns with the best SNR.

(Step S18) The receive beam pattern selection unit 47 of the wireless apparatus 21 feeds back to the wireless apparatus 11a transmit beam pattern of the combination of the transmit and receive beam patterns selected at step S17.

(Steps S19a and S19b) The transmit beam pattern setting unit 35 of the wireless apparatus 11 sets a transmit beam pattern of the transmitter 31 in the transmit beam pattern fed back at step S18.

The receive beam pattern setting unit 46 of the wireless apparatus 21 sets a receive beam pattern of the receiver 42 in a receive beam pattern of the combination of the transmit and receive beam patterns selected at step S17.

The transmitter 31 of the wireless apparatus 11 and the receiver 42 of the wireless apparatus 21 transmit and receive a data signal with the set transmit and receive beam patterns.

A code book will be described.

FIG. 9 illustrates a code book. In FIG. 9, an example of the code book of the wireless apparatus 11 is illustrated. As illustrated in FIG. 9, the code book is represented by using a matrix.

A parameter m illustrated in FIG. 9 corresponds to a row of the code book and further antennas of the wireless apparatus 11. For example, when the wireless apparatus 11 has 16 antennas, a value of M illustrated in FIG. 9 is equal to 16.

A parameter k illustrated in FIG. 9 corresponds to a column of the code book and further represents an index of a transmit beam pattern. For example, when the wireless apparatus 11 radiates 16 transmit beam patterns, a value of K illustrated in FIG. 9 is equal to 16.

A code book of a column of k=0 corresponds, for example, to the transmit beam pattern 1 illustrated in FIG. 7A. Each element of the code book in the column of k=0 represents a weight of transmission in each of the 16 antennas of the wireless apparatus 11.

Suppose, for example, that the wireless apparatus radiates the transmit beam pattern 1 through the 16 antennas. In this case, a weight of transmission of an antenna 1 is set to $w_{00}$, a weight of transmission of an antenna 2 is set to $w_{10}$, and so forth, and further a weight of transmission of an antenna 16 is set to $w_{M-10}$.

A code book of a column of k=1 further corresponds, for example, to the transmit beam pattern 2 illustrated in FIG. 7A. Each element of the code book in the column of k=1 represents a weight of transmission in each of the 16 antennas of the wireless apparatus 11.

Suppose, for example, that the wireless apparatus radiates the transmit beam pattern 2 through the 16 antennas. In this case, a weight of transmission of the antenna 1 is set to $w_{01}$, a weight of transmission of the antenna 2 is set to $w_{11}$, and so forth, and further a weight of transmission of the antenna 16 is set to $w_{M-11}$.

The transmit beam pattern switching unit 33 of the wireless apparatus 11 generates the code book by using the following formula (2).

$$w(m,k) = \frac{1}{\sqrt{M}} e^{j\frac{\pi}{8} \times floor\left[\frac{m \times \mod(k+K/2,K)}{K/16}\right]} \quad (2)$$

A parameter m of formula (2) takes values of 0, 1, ..., and M−1. A parameter M represents the number of antennas of the wireless apparatus 11. Further, a parameter k of formula (2) takes values of 0, 1, ..., and K−1. A parameter K represents the number of transmit beam patterns radiated by the wireless apparatus 11.

Specifically, the parameters m and k of formula (2) correspond to rows and columns of the code book illustrated in FIG. 9. When a predetermined value (m=0, 1, ..., and M−1, and k=0, 1, ..., and K−1) is substituted to the parameters m and k of formula (2), each element of the code book is then calculated.

A phase amount of each antenna in formula (2) is a multiple of +/−22.5 degrees.

The transmit beam pattern switching unit 33 also generates a transmit beam pattern by using a DFT (Discrete Fourier Transform). For example, the transmit beam pattern switching unit 33 also generates a code book by using the following formula (3).

$$w(m,k) = \frac{1}{\sqrt{M}} e^{-j2\pi(m-1)(k-1)/K} \quad (3)$$

A parameter m of formula (3) takes values of 1, 2, ..., and M. A parameter M represents the number of antennas of the wireless apparatus 11. Further, the parameter k of formula (2) takes values of 1, 2, ..., and K. A parameter K represents the number of transmit beam patterns radiated by the wireless apparatus 11.

A value of K of formulae (2) and (3) is the same as that of M. Accordingly, the number of transmit beam patterns is the same as the number of antennas.

In a method illustrated in FIGS. 5A, 5B, and 5C, and FIG. 6, a value of K is determined by using the following formula (4).

$$K = 2^{1+floor(\log 2(M))} \quad (4)$$

In formula (4), a value of K is about twice as large as the number M of antennas. That is, in a method illustrated in FIGS. 5A, 5B, and 5C, and FIG. 6, a size of the code book becomes larger (the number of transmit beam patterns becomes larger) and the number of processes becomes larger.

On the other hand, even if a value of K is the same as that of M, the wireless apparatus 11 keeps sufficient wireless quality. In addition, the above-described matter will be described later.

Figure 10:
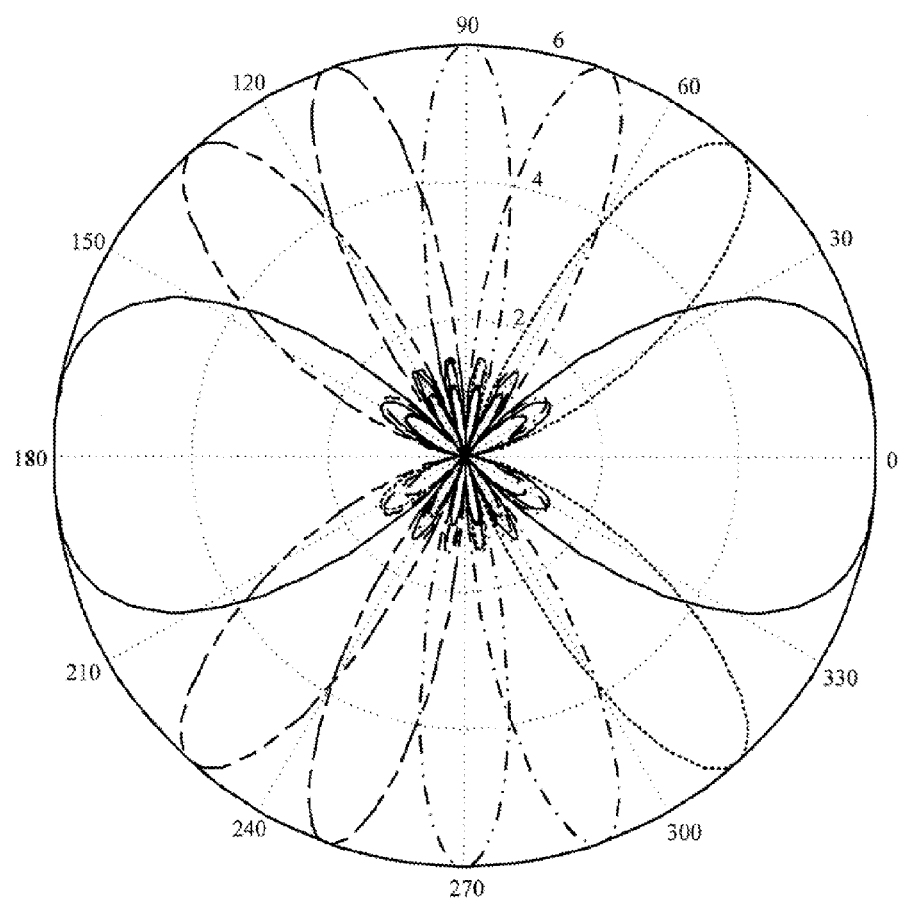
FIG. 10 illustrates an example of a transmit beam pattern.

FIG. 10 illustrates an example of the transmit beam pattern. In FIG. 10, an example where the transmit beam pattern switching unit 33 generates the transmit beam patterns by using formula (2) is illustrated. In the transmit beam pattern of FIG. 10, an example of using six antennas and six beam patterns is illustrated.

In the same manner as in the above description, the receive beam pattern switching unit 43 of the wireless apparatus 21 which receives a signal also generates a code book (receive beam patterns).

A phase rotation of the transmit beam pattern will be described.

When the transmit beam pattern fed back from the wireless apparatus 21 is set to a, transmit beam patterns obtained by rotating its phase back and forth are calculated by using the following formula (5).

$$WN(m,k)=a=(m)e^{j2\pi(m-1)(r_k-1)/(2*K)} \quad (5)$$

A parameter m of formula (5) takes values of 1, . . . , and M. A parameter $r_k$ takes values of $r_0=0$, $r_1=1$, and $r_2=2$.

In the case of $r_1=1$, formula (5) is equal to a(m). That is, formula (5) represents the fed back transmit beam pattern.

In the case of $r_0=0$, in formula (5), a phase of the fed back transmit beam pattern is rotated in the counterclockwise direction. Due to 2*K of the right side of formula (5), a transmit beam pattern obtained by the phase rotation is generated between the fed back transmit beam pattern and the adjacent transmit beam pattern in the counterclockwise direction. In the case of $r_2=2$, in formula (5), a phase of the fed back transmit beam pattern is rotated in the clockwise direction. Due to 2*K of the right side of formula (5), the transmit beam pattern obtained by the phase rotation is generated between the fed back transmit beam pattern and the adjacent transmit beam pattern in the clockwise direction.

Based on formula (5), the transmit beam pattern generation unit 34 of the wireless apparatus 11 generates a transmit beam pattern obtained by rotating a phase of the fed back transmit beam pattern. Based on formula (5), the transmit beam pattern generation unit 34 may previously generate a transmit beam pattern obtained by rotating a phase of the fed back transmit beam pattern and store it in the storage device such as a memory.

Figure 11:
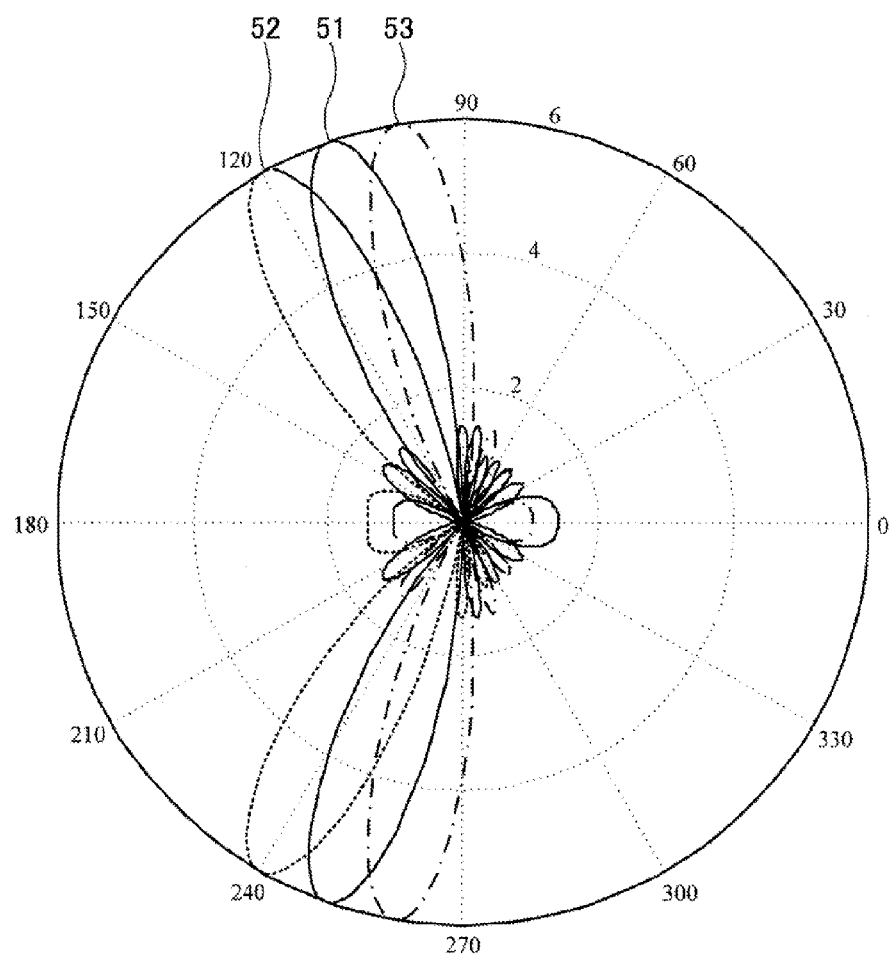
FIG. 11 illustrates a phase rotation.

FIG. 11 illustrates the phase rotation. A transmit beam pattern 51 illustrated in FIG. 11 represents the transmit beam pattern fed back from the wireless apparatus 21.

A transmit beam pattern 52 represents a transmit beam pattern obtained by rotating a phase of the fed back transmit beam pattern 51 in the counterclockwise direction. In formula (5), when the transmit beam pattern 51 is equal to a(m) and $r_0$ is equal to zero, the transmit beam pattern 52 is calculated.

A transmit beam pattern 53 represents a transmit beam pattern obtained by rotating a phase of the fed back transmit beam pattern 51 in the clockwise direction. In formula (5), when the transmit beam pattern 51 is equal to a(m) and $r_2$ is equal to two, the transmit beam pattern 53 is calculated.

In the same manner as in the above description, the receive beam pattern generation unit 45 of the wireless apparatus 21 which receives a signal also generates a receive beam pattern obtained by the phase rotation.

Figure 12:
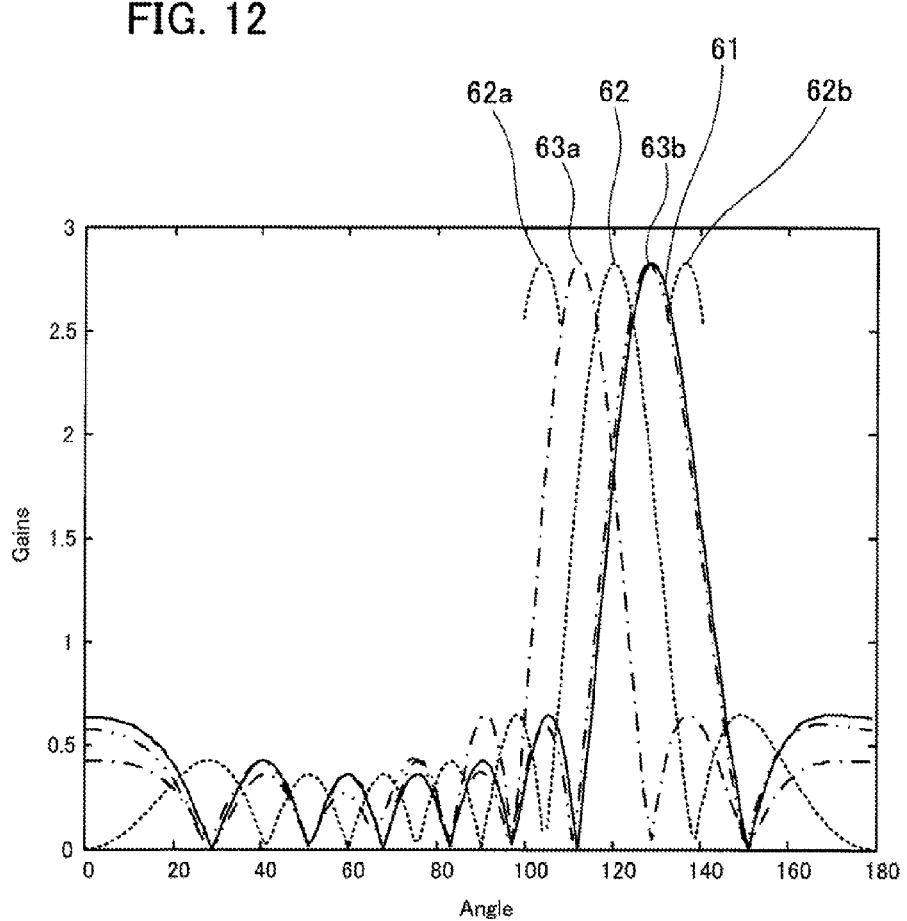
FIG. 12 illustrates maximization of a gain.

FIG. 12 illustrates maximization of gain. The horizontal axis of FIG. 12 represents the radiation angle of the transmit beam pattern. The longitudinal axis represents the gain.

A waveform 61 illustrated by a solid line represents a gain of a transmit beam pattern in which the wireless apparatus 11 and 21 perform wireless communication with best communication quality. As illustrated in the waveform 61, for example, the wireless apparatus 11 performs wireless communication at a maximum gain when a radiation angle of the transmit beam pattern is 130 degrees.

Waveforms 62, 62*a*, and 62*b* illustrated by dotted lines each indicate a gain of a transmit beam pattern radiated by the wireless apparatus 11 based on a code book. The waveforms 62*a* and 62*b* each indicate only a portion in a maximum value of the gain, and omit the other portion. In FIG. 12, only three transmit beam patterns radiated based on the code book are indicated; further, transmit beam patterns are actually generated as much as the number of sizes of the code book.

Further, the waveform 62 indicates a gain of the transmit beam pattern fed back from the wireless apparatus 21. That is, based on the transmit beam pattern (code book) fed back from the wireless apparatus 21, the wireless apparatus 11 radiates a transmit beam pattern with the gain illustrated in the waveform 62.

As illustrated in FIG. 12, based on the code book, the wireless apparatus 11 generates transmit beam patterns with the gain illustrated in the waveforms 62, 62*a*, and 62*b*. In FIG. 12, however, the transmit beam pattern (waveform 61) in which the maximum gain is obtained is generated between the transmit beam patterns (waveforms 62 and 62*b*) radiated based on the code book.

In other words, as illustrated in FIG. 12, the transmit beam pattern (waveform 62) fed back from the wireless apparatus 21 may be shifted from the optimum transmit beam pattern (waveform 61).

However, the wireless apparatus 11 rotates a phase of the fed back transmit beam pattern within an angle between the above transmit beam pattern and any of the adjacent transmit beam patterns. As a result, the wireless apparatus 11 obtains transmit beam patterns with the gain illustrated in the chain line waveform 63*a* and two-dot chain line waveform 63*b*.

As illustrated in the waveforms 61 and 63*b* of FIG. 12, for example, the wireless apparatus 11 radiates transmit beam patterns in which the maximum gain is actually obtained.

That is, even if a phase of the fed back transmit beam pattern based on the code book is shifted from that of the transmit beam pattern in which the maximum gain is actually obtained, since a phase of the fed back transmit beam pattern is rotated, the wireless apparatus 11 performs wireless communication at a high gain.

Figure 13:
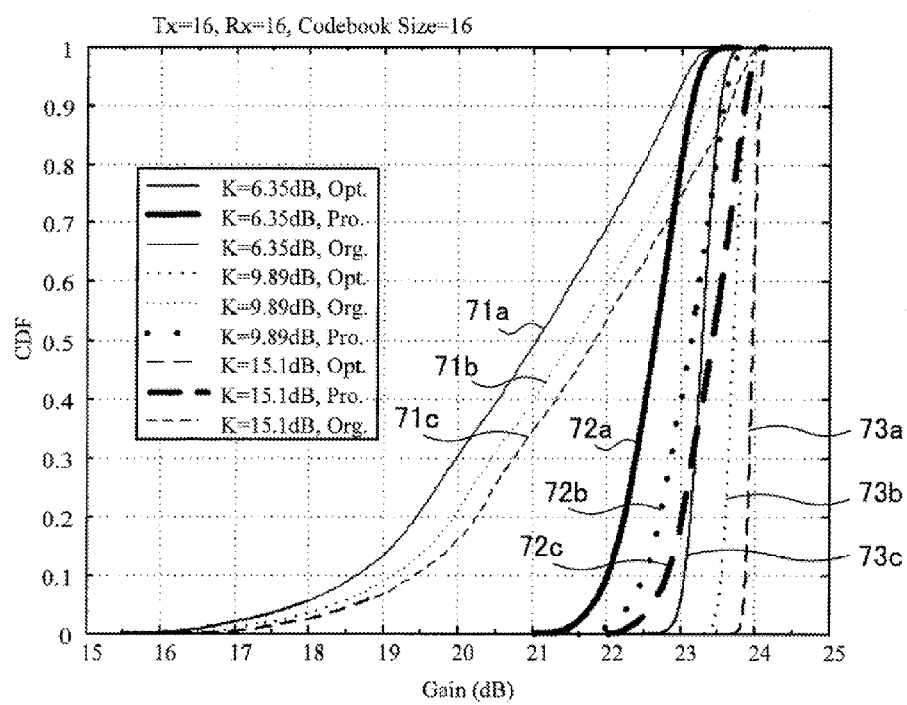
FIG. 13 illustrates a simulation result due to different Rician (k)

FIG. 13 illustrates simulation results due to different Rician (k). The horizontal axis of FIG. 13 represents the gain and the longitudinal axis represents the CDFs (Cumulative Distribution Function). A parameter K of FIG. 13 is a parameter for defining a Rician distribution and calculated based on a power rate between a direct wave and a fading wave. FIG. 13 illustrates simulation results in the case where the number of transmitting antennas is 16, the number of receiving antennas is 16, and a size of the code book is 16.

Waveforms 71*a* to 71*c* illustrated in FIG. 13 represent CDFs in different Ks (Rician) in the case where a beam pattern is selected by using a method illustrated in FIGS. 5A, 5B, and 5C, and FIG. 6. Waveforms 72*a* to 72*c* represent CDFs in different Ks (Rician) in the case where the wireless apparatus 11 and 21 select a beam pattern. Waveforms 73*a* to 73*c* further represent CDFs in different Ks of an ideal beam pattern.

In FIG. 13, as a waveform is more positioned on the right side, wireless communication with better communication quality is performed. As illustrated in the waveforms 72a to 72c, the wireless apparatus 11 and 21 perform wireless communication with wireless quality in almost ideal state.

Figure 14:
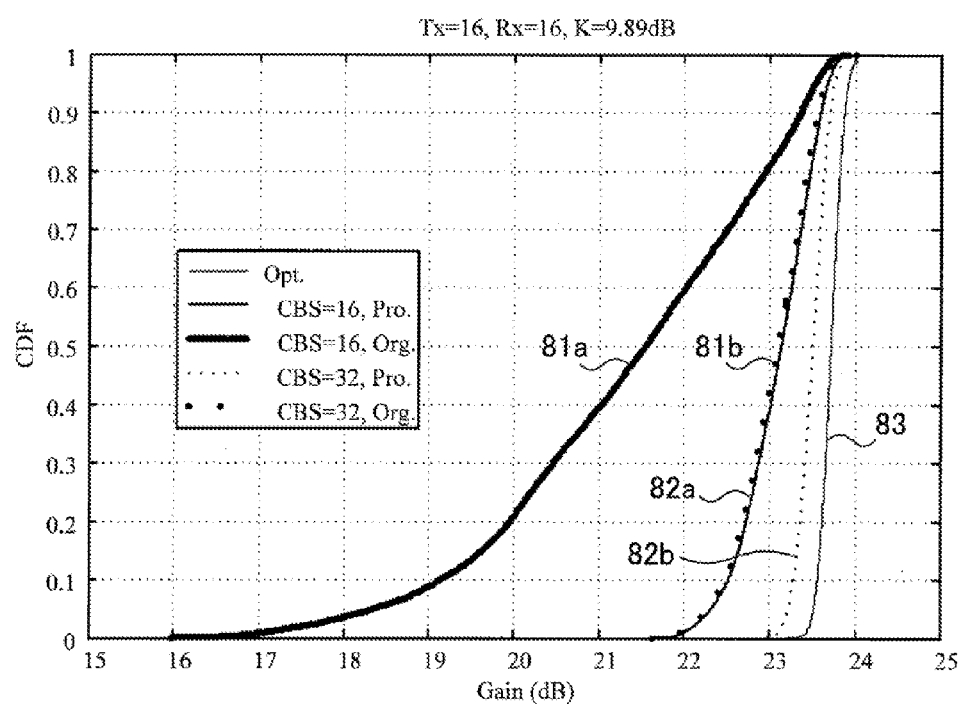
FIG. 14 illustrates a simulation result due to different code book sizes.

FIG. 14 illustrates simulation results due to different code book sizes. The horizontal axis of FIG. 14 represents the gains, and the longitudinal axis represents the CDFs. FIG. 14 illustrates simulation results in the case where the number of transmitting antennas is 16, the number of receiving antennas is 16, and K is equal to 9.89 dB. In FIG. 14, as a waveform is more positioned on the right side, wireless communication with better communication quality is performed.

A waveform 81a illustrated by a solid line represents a CDF in the case where a code book size is 16 and a beam pattern is selected by using the method illustrated in FIGS. 5A, 5B, and 5C, and FIG. 6. A waveform 81b illustrated by a dotted line represents a CDF in the case where a code book size is 32 and a beam pattern is selected by using the method illustrated in FIGS. 5A, 5B, and 5C, and FIG. 6.

A waveform 82a illustrated by a solid line represents a CDF in the case where a code book size is 16 and the wireless apparatus 11 and 21 select a beam pattern. A waveform 82b illustrated by a dotted line represents a CDF in the case where a code book size is 32 and the wireless apparatus 11 and 21 select a beam pattern.

A waveform 83 illustrated by a solid line represents a CDF in the case where a code book size is infinite and the wireless apparatus 11 and 21 select a beam pattern.

As illustrated in the waveforms 81a and 81b and waveforms 82a and 82b, a code book size of 32 is better in wireless quality than a code book size of 16. In short, as a code book size is larger, wireless quality is better.

Further, as illustrated in the waveforms 81b and 82a, even if a code book size is small, the wireless apparatus 11 and 21 obtain the same wireless quality by using the method illustrated in FIGS. 5A, 5B, and 5C, and FIG. 6.

As a result, the wireless apparatus 11 and 21 delete the number of steps for selecting optimum transmit and receive beam patterns and perform high-quality wireless communication. In short, the wireless apparatus 11 and 21 fast select an accurate beam pattern.

As can be seen from the above discussion, the wireless apparatus 11 and 21 select transmit and receive beam patterns with high reception quality and generate transmit and receive beam patterns obtained by rotating their phases. From among the selected transmit and receive beam patterns and the transmit and receive beam patterns obtained by the phase rotation, the wireless apparatus 11 and 21 then select a combination of the transmit and receive beam patterns with high reception quality. The process permits the wireless apparatus 11 and 21 to fast select accurate transmit and receive beam patterns.

As illustrated in step S14a of FIG. 8, for example, the transmit beam pattern switching unit 33 of the wireless apparatus 11 sets a transmit beam pattern of the transmitter 31 in the fed back transmit beam pattern; further, may set it in an arbitrary transmit beam pattern.

Third Embodiment

A third embodiment will be described in detail below with reference to drawings. In the second embodiment, two transmit beam patterns obtained by a phase rotation are generated from one transmit beam pattern. Two receive beam patterns obtained by the phase rotation are further generated from one receive beam pattern. In the third embodiment, four transmit beam patterns obtained by the phase rotation are generated from one transmit beam pattern. Four receive beam patterns obtained by the phase rotation are further generated from one receive beam pattern.

A wireless communication system according to the third embodiment is the same as that of FIG. 2. Further, blocks of wireless apparatus on the transmission and reception sides according to the third embodiment are the same as those of FIGS. 3 and 4; however, partially different in functions. Hereinafter, different functions will be described.

Figure 15:
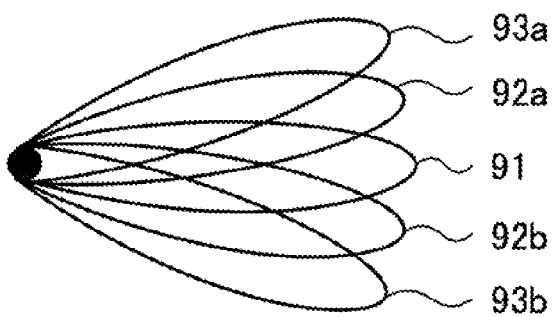
FIG. 15 illustrates a phase rotation according to a third embodiment.

FIG. 15 illustrates the phase rotation according to the third embodiment. A transmit beam pattern illustrated in FIG. 15 represents the transmit beam pattern fed back from the wireless apparatus 21. At step S13 of FIG. 8, for example, the transmit beam pattern 91 represents the transmit beam pattern fed back to the wireless apparatus 11.

Transmit beam patterns 92a, 92b, 93a, and 93b each represent a transmit beam pattern obtained by rotating a phase of the transmit beam pattern 91. The transmit beam pattern generation unit 34 rotates a phase of the fed back transmit beam pattern 91, and generates the transmit beam patterns 92a, 92b, 93a, and 93b.

Between the fed back transmit beam pattern 91 and any of transmit beam patterns adjacent to the above transmit beam pattern, the transmit beam pattern generation unit 34 rotates a phase of the fed back transmit beam pattern 91. Accordingly, the transmit beam patterns 92a and 93a obtained by the phase rotation are generated between the fed back transmit beam pattern 91 and the transmit beam pattern (not illustrated) adjacent to the transmit beam pattern 91 in the counterclockwise direction. Further, the transmit beam patterns 92b and 93b obtained by the phase rotation are generated between the fed back transmit beam pattern 91 and the transmit beam pattern (not illustrated) adjacent to the transmit beam pattern 91 in the clockwise direction.

When the transmit beam pattern fed back from the wireless apparatus 21 is set to a, transmit beam patterns obtained by rotating its phase back and forth are calculated by using the following formula (6).

$$WN(m,k)=a(m)e^{j2\pi(m-1)(r_k-1)/(4*K)} \quad (6)$$

A parameter m of formula (6) takes values of 1, ..., and M. A parameter $r_k$ takes values of $r_1=-1$, $r_2=0$, $r_3=1$, $r_4=2$, and $r_5=3$.

In the case of $r_3=1$, formula (6) is equal to a(m). Specifically, formula (6) represents the fed back transmit beam pattern. For example, the transmit beam pattern 91 illustrated in FIG. 15 corresponds to the case of $r_3=1$.

In the case of $r_0=-1$, in formula (6), a phase of the fed back transmit beam pattern is rotated in the counterclockwise direction. For example, the transmit beam pattern 93a illustrated in FIG. 15 corresponds to the case of $r_0=-1$.

In the case of $r_1=0$, in formula (6), a phase of the fed back transmit beam pattern is rotated in the counterclockwise direction. For example, the transmit beam pattern 92a illustrated in FIG. 15 corresponds to the case of $r_1=0$.

Due to 4*K of the right side of formula (6), the above-described transmit beam patterns obtained by the phase rotation are generated between the fed back transmit beam pattern and the adjacent transmit beam pattern (not illustrated) in the counterclockwise direction.

In the case of $r_4=2$, in formula (6), a phase of the fed back transmit beam pattern is rotated in the clockwise direction. For example, the transmit beam pattern 92b illustrated in FIG. 15 corresponds to the case of $r_4=2$.

In the case of $r_5=3$, in formula (6), a phase of the fed back transmit beam pattern is rotated in the clockwise direction.

For example, the transmit beam pattern 93b illustrated in FIG. 15 corresponds to the case of $r_5=3$.

Due to 4*K of the right side of formula (6), the above-described transmit beam patterns obtained by the phase rotation are generated between the fed back transmit beam pattern and the adjacent transmit beam pattern (not illustrated) in the clockwise direction.

In the same manner as in the above description, the receive beam pattern generation unit 45 of the wireless apparatus 21 which receives a signal also generates four receive beam patterns obtained by the phase rotation.

As can be seen from the above discussion, the wireless apparatus 11 on the transmission side generates four transmit beam patterns obtained by the phase rotation from one transmit beam pattern. The wireless apparatus 21 on the reception side further generates four receive beam patterns obtained by the phase rotation from one receive beam pattern. The process permits the wireless apparatus 11 and 21 to fast select accurate transmit and receive beam patterns.

In the above description, four transmit beam patterns and four receive beam patterns are generated from one transmit beam pattern and one receive beam pattern. Further, six or more transmit beam patterns and six or more receive beam patterns are also generated from one transmit beam pattern and one receive beam pattern. Note that, when a number of transmit and receive beam patterns are generated, the number of combinations of transmit and receive beam patterns becomes large, and therefore processing speed is reduced.

Fourth Embodiment

A fourth embodiment will be described in detail below with reference to drawings. In the second embodiment, the wireless apparatus on the reception side feeds back one transmit beam pattern, and the wireless apparatus on the transmission side generates two transmit beam patterns obtained by the phase rotation from the fed back transmit beam pattern. The wireless apparatus on the reception side further selects one receive beam pattern and generates two receive beam patterns obtained by the phase rotation from the selected receive beam pattern. In the fourth embodiment, a wireless apparatus on the reception side feeds back two transmit beam patterns, and a wireless apparatus on the transmission side generates four transmit beam patterns obtained by the phase rotation from the two fed back transmit beam patterns. The wireless apparatus on the reception side further generates four receive bema patterns obtained by the phase rotation from the two selected receive beam patterns.

A wireless communication system according to the fourth embodiment is the same as that of FIG. 2. Further, blocks of wireless apparatus on the transmission and reception sides according to the fourth embodiment are the same as those of FIGS. 3 and 4; however, partially different in functions. Hereinafter, different functions will be described.

Figure 16:
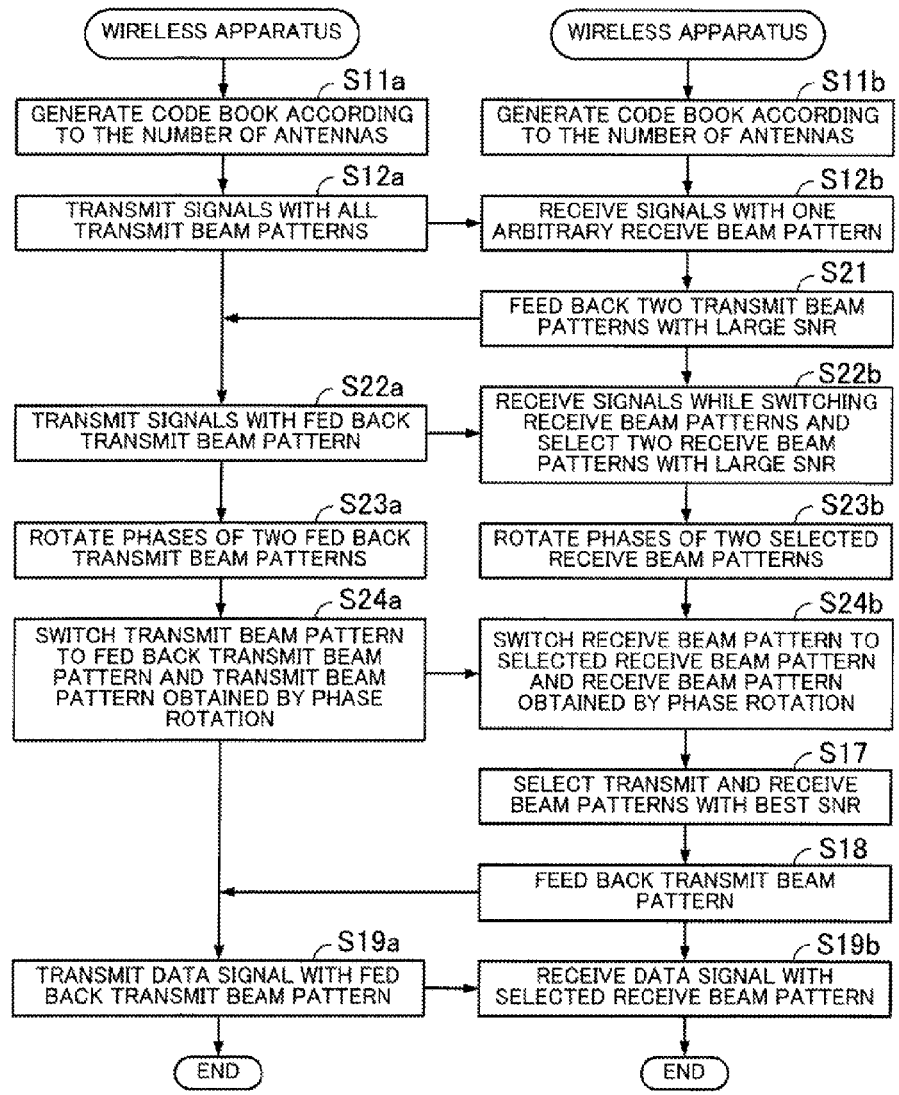
FIG. 16 is a sequence diagram illustrating operations of a wireless apparatus according to a fourth embodiment.

FIG. 16 is a sequence diagram illustrating operations of the wireless apparatus according to the fourth embodiment. In FIG. 16, the same processes as those of FIG. 8 are indicated by the same reference numerals as in FIG. 8, and the description will not be repeated here. In FIG. 16, processes of steps S13, S14a, S14b, S15a, S15b, S16a, and S16b illustrated in FIG. 8 are different.

(Step S21) The receive beam pattern selection unit 44 measures an SNR of each transmit beam pattern. The receive beam pattern selection unit 44 selects two transmit beam patterns in descending order of the SNR, and feeds back them to the wireless apparatus 11 through the transmitter 41.

(Steps S22a and S22b) The transmit beam pattern switching unit 33 of the wireless apparatus 11 sets a transmit beam pattern of the transmitter 31 in the fed back transmit beam pattern with largest SNR. The receive beam pattern switching unit 43 of the wireless apparatus 21 switches a receive beam pattern of the receiver 42.

The receive beam pattern generation unit 45 measures an SNR of each of the switched receive beam patterns, and selects two receive beam patterns in descending order of the SNR.

(Steps S23a and S23b) The transmit beam pattern generation unit 34 of the wireless apparatus 11 generates transmission beam patterns obtained by rotating a phase of each of the two transmit beam patterns fed back at step S21.

For example, the transmit beam pattern generation unit 34 rotates a phase of a transmit beam pattern with a largest SNR in the counterclockwise and clockwise directions, and generates two transmit beam patterns. The transmit beam pattern generation unit 34 further rotates a phase of a transmit beam pattern with a second largest SNR in the counterclockwise and clockwise directions, and generates two transmit beam patterns.

The receive beam pattern generation unit 45 of the wireless apparatus 21 generates receive beam patterns obtained by rotating a phase of each of the two receive beam patterns selected at step S22b.

For example, the receive beam pattern generation unit 45 rotates a phase of the receive beam pattern with the largest SNR in the counterclockwise and clockwise directions, and generates two receive beam patterns. The receive beam pattern generation unit 45 further rotates a phase of the receive beam pattern with the second largest SNR in the counterclockwise and clockwise directions, and generates two receive beam patterns.

(Steps S24a and S24b) The transmit beam pattern switching unit 33 switches a transmit beam pattern of the transmitter 31 to the two fed back transmit beam patterns and the four transmit beam patterns obtained by the phase rotation. The receive beam pattern switching unit 43 switches a receive beam pattern of the receiver 42 to the two selected receive beam patterns and the four receive beam patters obtained by the phase rotation.

The transmit and receive beam pattern switching units 33 and 43 switch beam patterns so that the transmit and receive beam patterns may be totally combined with each other. In the case of the foregoing example, 36 combinations of the transmit and receive beam patterns are totally present.

Figure 17:
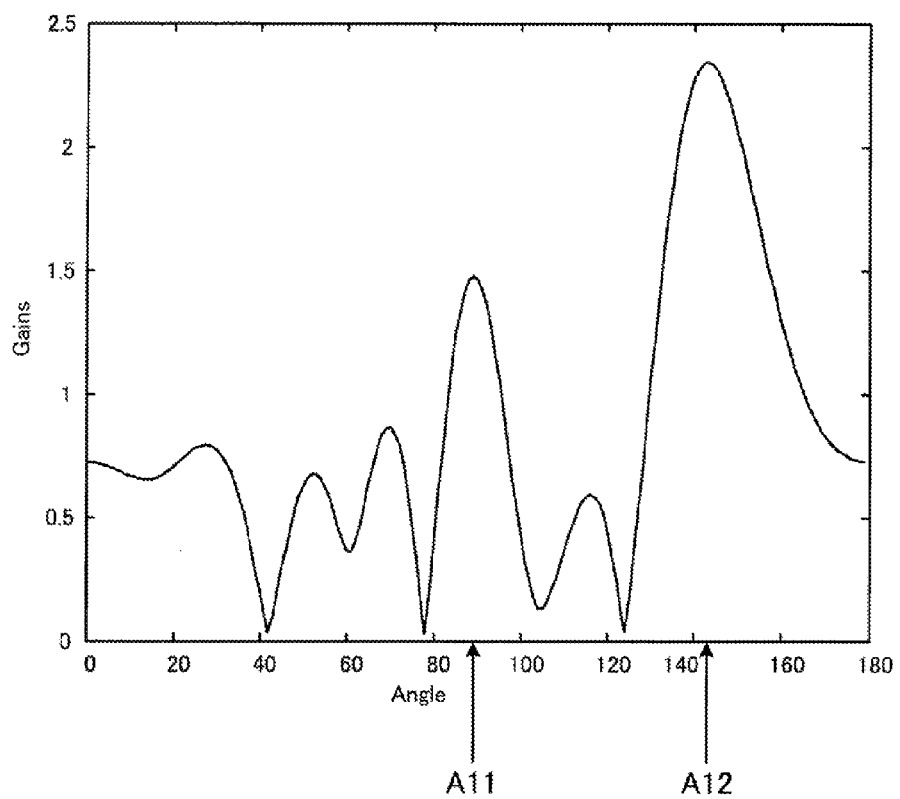
FIG. 17 illustrates a selection of a transmit beam pattern.

FIG. 17 illustrates a selection of the transmit beam pattern. The horizontal axis of FIG. 17 represents the radiation angle of the transmit beam pattern. The longitudinal axis represents the gain. FIG. 17 illustrates a gain at the time when the wireless apparatus 21 on the reception side fixes a receive beam pattern and the wireless apparatus 11 on the transmission side varies a radiation angle of a transmit beam pattern.

As illustrated in step S21 of FIG. 16, the receive beam pattern selection unit 44 of the wireless apparatus 21 selects two transmit beam patterns with large SNRs. For example, the receive beam pattern selection unit selects a transmit beam pattern having two radiation angles with large gains (SNRs) illustrated in FIG. 17. For example, the receive beam pattern selection unit 44 selects a transmit beam pattern having radiation angles of arrows A11 and A12 illustrated in FIG. 17. In addition, in FIG. 17, a radiation angle of the transmit beam pattern is continuously varied. As a matter of fact, however, a radiation angle is discretely varied.

As can be seen from the above discussion, the wireless apparatus on the reception side feeds back two transmit beam patterns, and the wireless apparatus on the transmission side generates four transmit beam patterns obtained by the phase rotation from each of the two fed back transmit beam patterns. The wireless apparatus on the reception side further generates four receive beam patterns obtained by the phase rotation from the two selected receive beam patterns. The process permits the wireless apparatus 11 and 21 to fast select accurate transmit and receive beam patterns.

The fourth embodiment may be combined with the third embodiment. For example, the wireless apparatus 11 may generate four transmit beam patterns (eight, in total) from each of the two fed back transmit beam patterns, and the wireless apparatus 21 may generate four transmit beam patterns (eight, in total) from each of the two selected receive beam patterns.

According to the proposed wireless apparatus, an accurate beam pattern is fast selected.

All examples and conditional language provided herein are intended for the pedagogical purposes to aid the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions and alterations could be made hereto without departing from the spirit and scope of the invention.

What is claimed is:

1. A wireless apparatus to transmit a signal by using a plurality of antennas, the wireless apparatus comprising:
    a transmitter configured to transmit the signal;
    a first switching unit configured to switch a transmit beam pattern of the transmitter;
    a first receiver configured to receive, from a wireless reception apparatus which receives the signal, a transmit beam pattern with better reception quality among transmit beam patterns switched to by the first switching unit;
    a generation unit configured to generate a transmit beam pattern obtained by rotating a phase of the transmit beam pattern received by the first receiver;
    a second switching unit configured to switch a transmit beam pattern of the transmitter between a transmit beam pattern received by the first receiver and a transmit beam pattern generated by the generation unit;
    a second receiver configured to receive, from the wireless reception apparatus, a transmit beam pattern of a combination with better reception quality out of combinations of the transmit beam patterns switched to by the second switching unit and receive beam patterns switched to by the wireless reception apparatus; and
    a setting unit configured to set a transmit beam pattern of the transmitter in the transmit beam pattern received by the second receiver.

2. The wireless apparatus according to claim 1, wherein the first switching unit switches a transmit beam pattern of the transmitter to as many transmit beam patterns as the number of the plurality of antennas.

3. The wireless apparatus according to claim 1, wherein the generation unit rotates a phase of the transmit beam pattern received by the first receiver between the transmit beam pattern received by the first receiver and any of transmit beam patterns adjacent to the transmit beam pattern.

4. The wireless apparatus according to claim 1, wherein the generation unit generates two or four transmit beam patterns obtained by rotating a phase of the transmit beam pattern received by the first receiver.

5. The wireless apparatus according to claim 1, wherein the first receiver receives two transmit beam patterns with better reception quality.

6. The wireless apparatus according to claim 1, further comprising a third switching unit configured to switch a beam pattern of the transmitter to the transmit beam pattern received by the first receiver when the wireless reception apparatus selects a receive beam pattern with better reception quality.

7. The wireless apparatus according to claim 1, further comprising a fourth switching unit configured to switch a transmit beam pattern of the transmitter to a transmit beam pattern when the wireless reception apparatus selects a receive beam pattern with better reception quality.

8. A wireless apparatus to receive a signal by using a plurality of antennas, the wireless apparatus comprising:
    a receiver configured to receive the signal;
    a first switching unit configured to switch a receive beam pattern of the receiver;
    a first selection unit configured to select a receive beam pattern with better reception quality from among the receive beam patterns switched to by the first switching unit;
    a generation unit configured to generate a receive beam pattern obtained by rotating a phase of the receive beam pattern selected by the first selection unit;
    a second switching unit configured to switch a receive beam pattern of the receiver to the receive beam pattern selected by the first selection unit and the receive beam pattern generated by the generation unit;
    a second selection unit configured to select a receive beam pattern of a combination with better reception quality out of combinations of the receive beam patterns switched to by the second switching unit and transmit beam patterns switched to by a wireless transmission apparatus which transmits the signal; and
    a setting unit configured to set a receive beam pattern of the receiver in the receive beam pattern selected by the second selection unit.

9. The wireless apparatus according to claim 8, wherein the first switching unit switches a receive beam pattern of the receiver to as many receive beam patterns as the number of the plurality of antennas.

10. The wireless apparatus according to claim 8, wherein the generation unit rotates a phase of the receive beam pattern selected by the first selection unit between the receive beam pattern selected by the first selection unit and any of receive beam patterns adjacent to the receive beam pattern.

11. The wireless apparatus according to claim 8, wherein the generation unit generates two or four receive beam patterns obtained by rotating a phase of the receive beam pattern selected by the first selection unit.

12. The wireless apparatus according to claim 8, wherein the first selection unit selects two receive beam patterns with better reception quality.

13. A wireless communication system comprising:
    a wireless transmission apparatus; and
    a wireless reception apparatus, wherein:
    the wireless transmission apparatus and the wireless reception apparatus perform wireless communication by using a plurality of antennas;
    the wireless transmission apparatus includes
        a transmitter which transmits a signal, a first transmission side switching unit which switches a transmit beam pattern of the transmitter, a first receiver which receives, from the wireless reception apparatus, a transmit beam pattern with better reception quality among transmit beam patterns switched to by the first transmission side switching unit, a transmission side generation unit which generates a transmit beam pattern obtained by rotating a phase of the transmit beam pattern received by the first receiver, a second transmission side switching unit which switches a transmit beam pattern of the transmitter to a transmit beam pattern received by the first receiver and a transmit beam pattern generated by the transmission side generation unit, a second receiver which receives, from the wireless reception apparatus, a transmit beam pattern of a combination with better reception quality out of combinations of the transmit beam patterns switched to by the second transmission side switching unit and receive beam patterns switched to by the wireless reception apparatus, and a transmission side setting unit which sets a transmit beam pattern of the transmitter in the transmit beam pattern received by the second receiver; and the wireless reception apparatus includes a receiver which receives the signal, a first reception side switching unit which switches a receive beam pattern of the receiver, a first selection unit which selects a receive beam pattern with better reception quality among receive beam patterns switched to by the first reception side switching unit, a reception side generation unit which generates a receive beam pattern obtained by rotating a phase of the receive beam pattern selected by the first selection unit, a second reception side switching unit which switches a receive beam pattern of the receiver to the receive beam pattern selected by the first selection unit and the receive beam pattern generated by the reception side generation unit, a second selection unit which selects a receive beam pattern of a combination with better reception quality out of combinations of the receive beam patterns switched to by the second reception side switching unit and transmit beam patterns switched to by the wireless transmission apparatus, and a reception side setting unit which sets a receive beam pattern of the receiver in the receive beam pattern selected by the second selection unit.

* * * * *